US012774693B2

(12) United States Patent
Krack et al.

(10) Patent No.: US 12,774,693 B2
(45) Date of Patent: Oct. 27, 2026

(54) PUMPED-STORAGE POWER PLANT, METHOD FOR OPERATING A PUMPED-STORAGE POWER PLANT, AND PUMPED-STORAGE SYSTEM

(71) Applicants: Robin Krack, Sinntal-Jossa (DE); Udo Gärtner, Sinntal-Sannerz (DE)

(72) Inventors: Robin Krack, Sinntal-Jossa (DE); Udo Gärtner, Sinntal-Sannerz (DE)

( * ) Notice: Subject to any disclaimer, the term of this patent is extended or adjusted under 35 U.S.C. 154(b) by 914 days.

(21) Appl. No.: 17/432,637

(22) PCT Filed: Feb. 20, 2020

(86) PCT No.: PCT/EP2020/054460
§ 371 (c)(1),
(2) Date: Aug. 20, 2021

(87) PCT Pub. No.: WO2020/169720
PCT Pub. Date: Aug. 27, 2020

(65) Prior Publication Data

US 2022/0145845 A1 May 12, 2022

(30) Foreign Application Priority Data

Feb. 20, 2019 (DE) ..................... 10 2019 104 306.9

(51) Int. Cl.
*F03B 13/06* (2006.01)
*F04B 35/00* (2006.01)

(52) U.S. Cl.
CPC .............. *F03B 13/06* (2013.01); *F04B 35/00* (2013.01)

(58) Field of Classification Search
CPC .......... F03B 13/06; F04B 35/00; Y02E 10/20; Y02E 60/16
See application file for complete search history.

(56) References Cited

U.S. PATENT DOCUMENTS 3,952,517 A * 4/1976 Decker .................. F03B 17/00 417/337
3,961,479 A * 6/1976 Anderson ............ F03B 17/025 60/496

(Continued)

FOREIGN PATENT DOCUMENTS

CN 102954050 B 5/2016
DE 102008040393 A1 1/2010

(Continued)

OTHER PUBLICATIONS

German Action dated Oct. 30, 2019, Application No. 10 2019 104 306.9 (with English translation).

(Continued)

*Primary Examiner* — Dominick L Plakkoottam
(74) *Attorney, Agent, or Firm* — Banner & Witcoff, Ltd.

(57) ABSTRACT

A pumped-storage power plant may include a working cylinder partially submerged in a working fluid reservoir having an upper fluid compartment above a fluid level of the working fluid reservoir and a lower fluid compartment below the fluid level, a buoyant piston movably guided in the direction of gravity relative to the working cylinder and which seals off the upper fluid compartment such that a gravitationally induced exchange of fluid between the upper and the lower fluid compartment is prevented. The plant may operate in an energy charging mode where working fluid is introduced into the upper fluid compartment so that the buoyant piston is submerged in the lower fluid compartment, and an energy delivery mode where upper fluid is pressed out of the upper fluid compartment and/or a fluid column of the upper fluid built up during the energy charging mode is discharged from the upper fluid compartment.

14 Claims, 11 Drawing Sheets

(56) References Cited

U.S. PATENT DOCUMENTS

Figure 1:
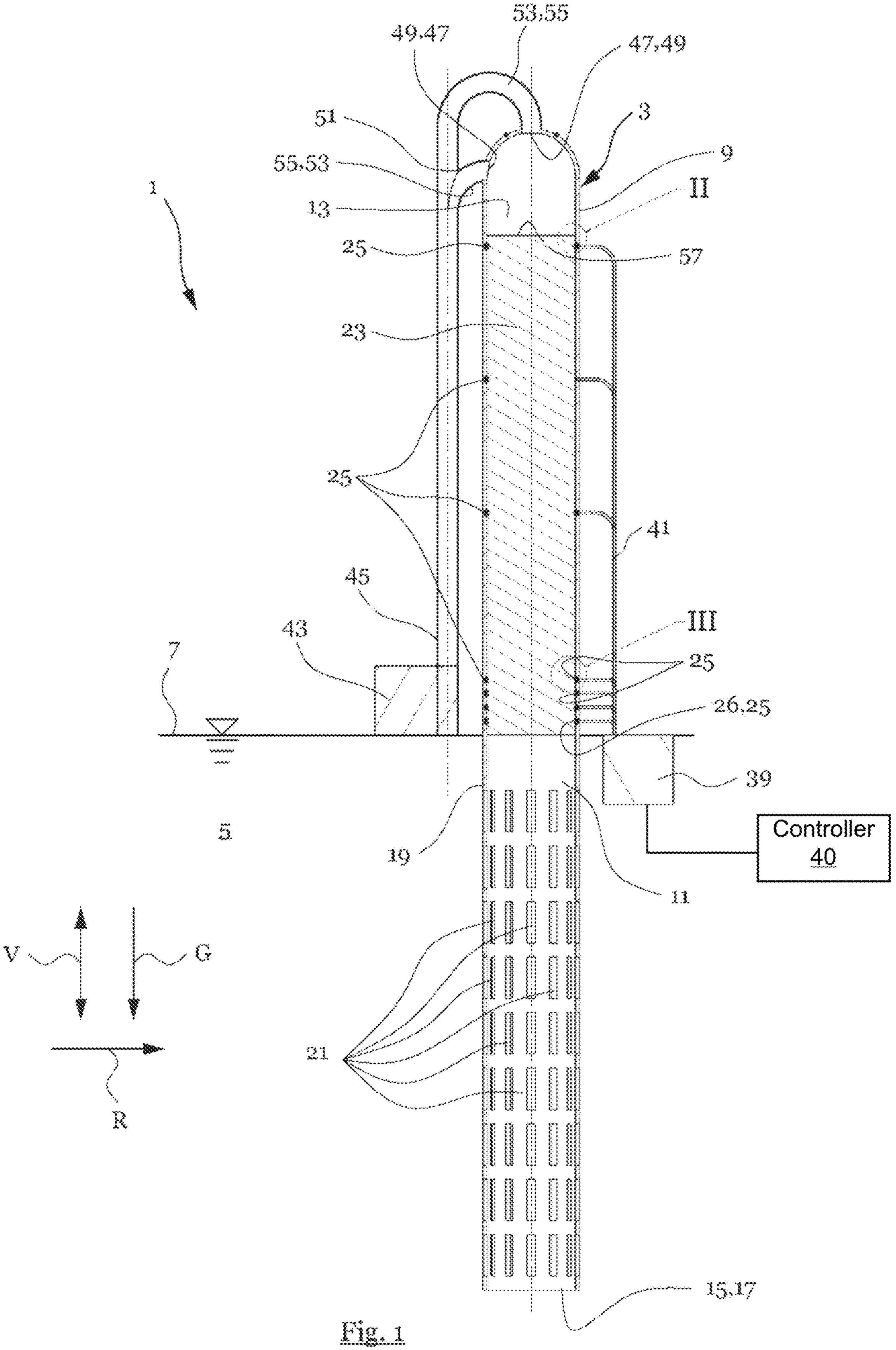

| | | | | |
|---|---|---|---|---|
| 4,206,608 | A | 6/1980 | Bell | |
| 4,425,510 | A * | 1/1984 | Jury | F03B 13/262 60/505 |
| 2007/0130929 | A1 * | 6/2007 | Khan | F03B 13/185 60/398 |
| 2008/0012344 | A1 * | 1/2008 | Buffard | F03B 13/20 417/258 |
| 2015/0056085 | A1 * | 2/2015 | Fiske | E02B 9/00 417/313 |
| 2017/0122284 | A1 | 5/2017 | Mesinger | |

FOREIGN PATENT DOCUMENTS

| | | | |
|---|---|---|---|
| DE | 102011081598 | A1 | 2/2013 |
| DE | 102014016640 | A1 | 5/2016 |
| JP | 86365865 | U | 4/1988 |
| JP | H0329584 | * | 6/1991 |

OTHER PUBLICATIONS

International Search Report and Written Opinion dated May 29, 2020, Application No. PCT/EP2020/054460 (with English translation).

* cited by examiner

PUMPED-STORAGE POWER PLANT, METHOD FOR OPERATING A PUMPED-STORAGE POWER PLANT, AND PUMPED-STORAGE SYSTEM

CROSS REFERENCE TO RELATED APPLICATIONS

This patent application is a U.S. National Stage application of International Application No. PCT/EP2020/054460, filed Feb. 20, 2020, which claims priority to German Patent Application No. 10 2019 104 306.9, filed Feb. 20, 2019, each of which is incorporated herein by reference in its entirety.

BACKGROUND

Field

The present disclosure relates to a pumped-storage power plant. In addition, the present disclosure relates to a method for operating a pumped-storage power plant. Furthermore, the present disclosure provides a pumped-storage system.

Related Art

Due to the finite nature of fossil energy sources, there is a growing need and demand for renewable energies. Unlike conventional energy producers such as power plants, the production of energy by means of renewable energy sources is erratic and depends, for example, on weather conditions. This poses numerous challenges. For example, there can be a surplus of green electricity generated by means of renewable energy sources. Conversely, depending on the climatic conditions and the associated highly variable availability of wind and solar energy, there is often the problem that too little green electricity is available and that it becomes necessary to fall back on fossil fuels again. The general objective is to temporarily store a sufficient amount of surplus green electricity in such a manner that it can be made commercially available again at a specific juncture of a grid overload or in climatic conditions in which no green electricity can be generated. In light of the worldwide limited potential in terms of energy/electricity storage facilities of a sufficient size and economic viability, there is an ongoing search for new solutions.

Among the known storage concepts of pumped-storage power plants, batteries, compressed air storage, flywheel storage and thermal energy storage, in particular pumped-storage plants have stood out. The latter pump water from a water reservoir at a lower elevation (lower water) during periods of low electricity consumption, for example at night, to a reservoir at a higher elevation (higher water) where it is stored. In order to be able to satisfy peak power demands and make the stored energy available again, the higher water with the increased energy is conducted back into the lower water via electricity-generating turbine units in order to generate electricity. The geographic potential for such pumped storage plants is highly limited worldwide.

DE 10 2014 016 640 A1 discloses an underground gravity-pumped-storage system for storing electrical energy. A piston that can be moved up and down is arranged in a sealed manner in a hermetically sealed, underground water shaft. By means of a turbine-pump arrangement, the water in the water shaft can be pumped in such a manner that the piston can be raised and lowered. In order to store energy, water is pumped under the piston so as to raise it against the force of gravity, i.e. the force of the weight of the piston, and thus generate potential energy. In order to convert the potential energy into electrical energy, the piston is moved back to the lowered position, whereby water is pumped back to the turbine-pump arrangement, thereby driving the turbine, by means of which a generator can be operated.

A drawback of this type of pumped-storage system is the large amount of space required for its underground installation. Very large depths are necessary for the pumped-storage system in particular in order to provide high energy-storage capacities. Furthermore, it has proven to be a drawback that the pump must be very powerful in order to raise the piston against its weight force by means of the water pressure force. This type of pumped-storage system is thus susceptible to failures.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
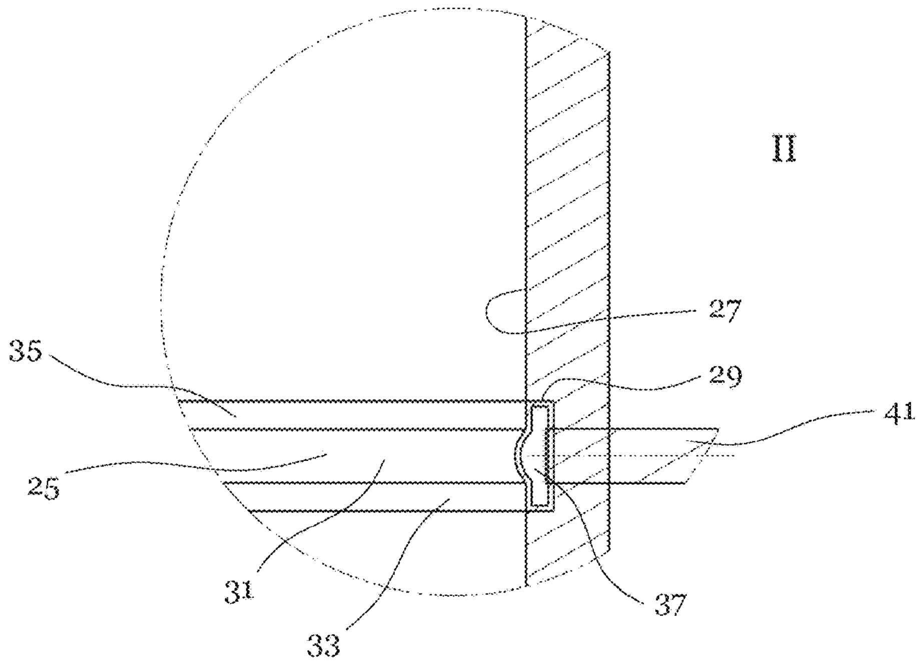
Figure 3:
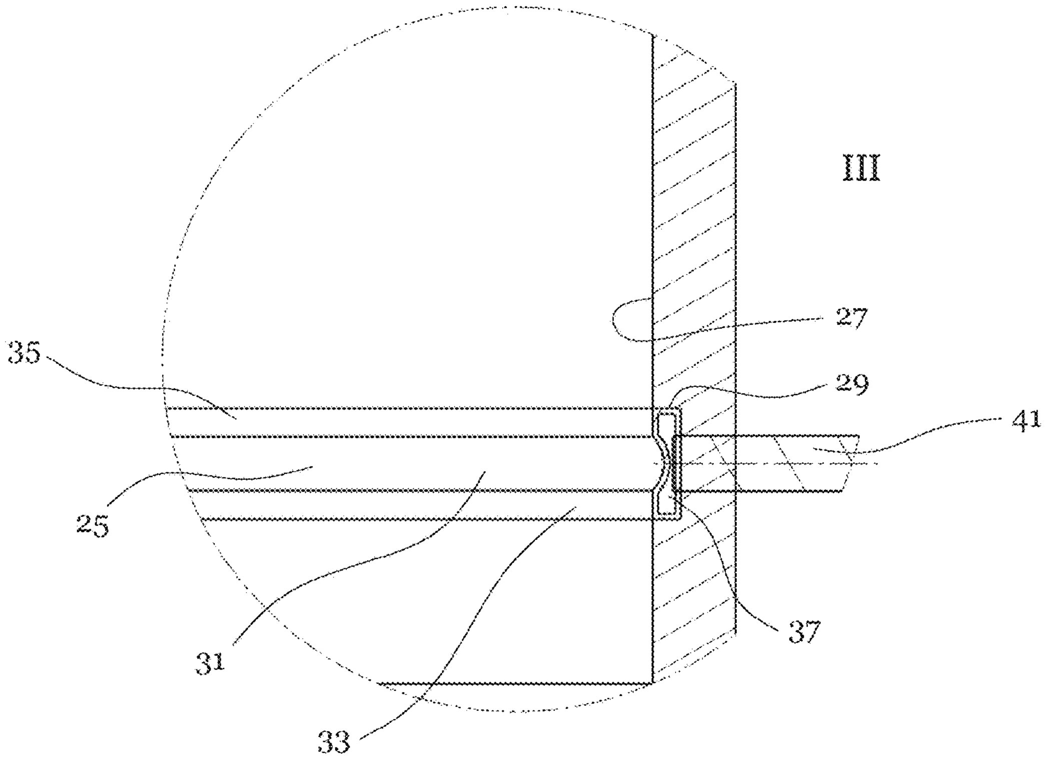
Figure 4:
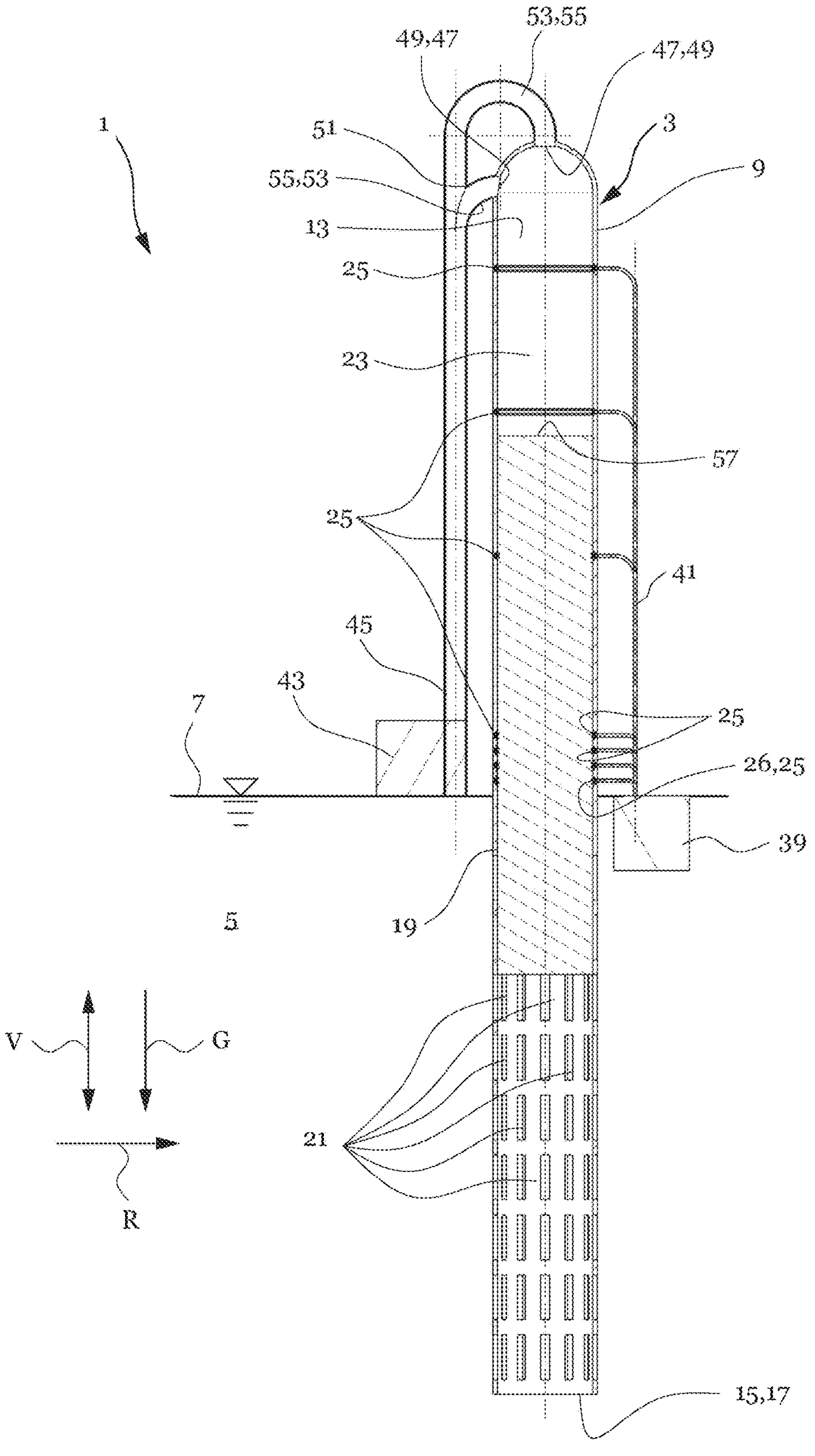
Figure 5:
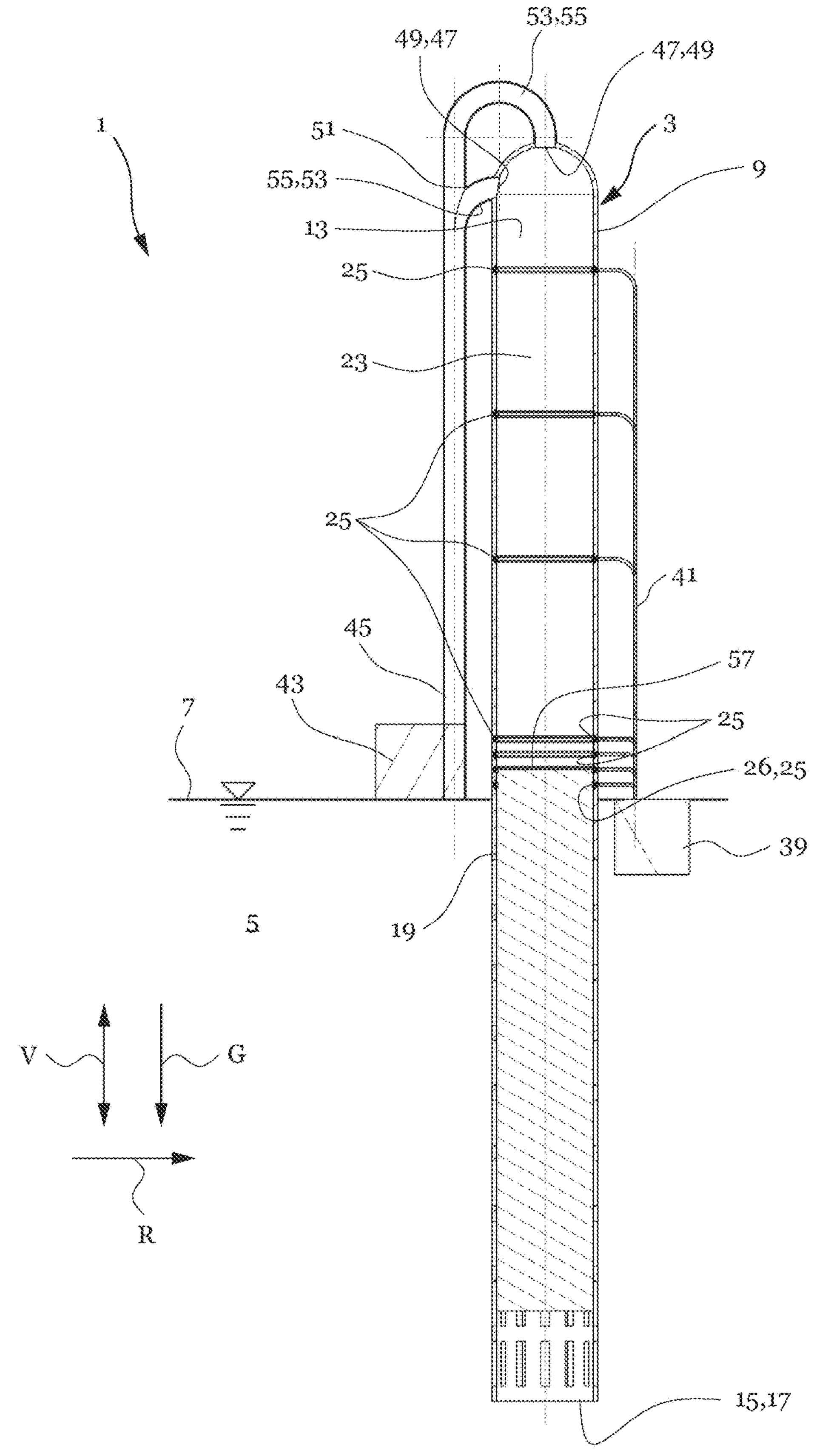
Figure 6:
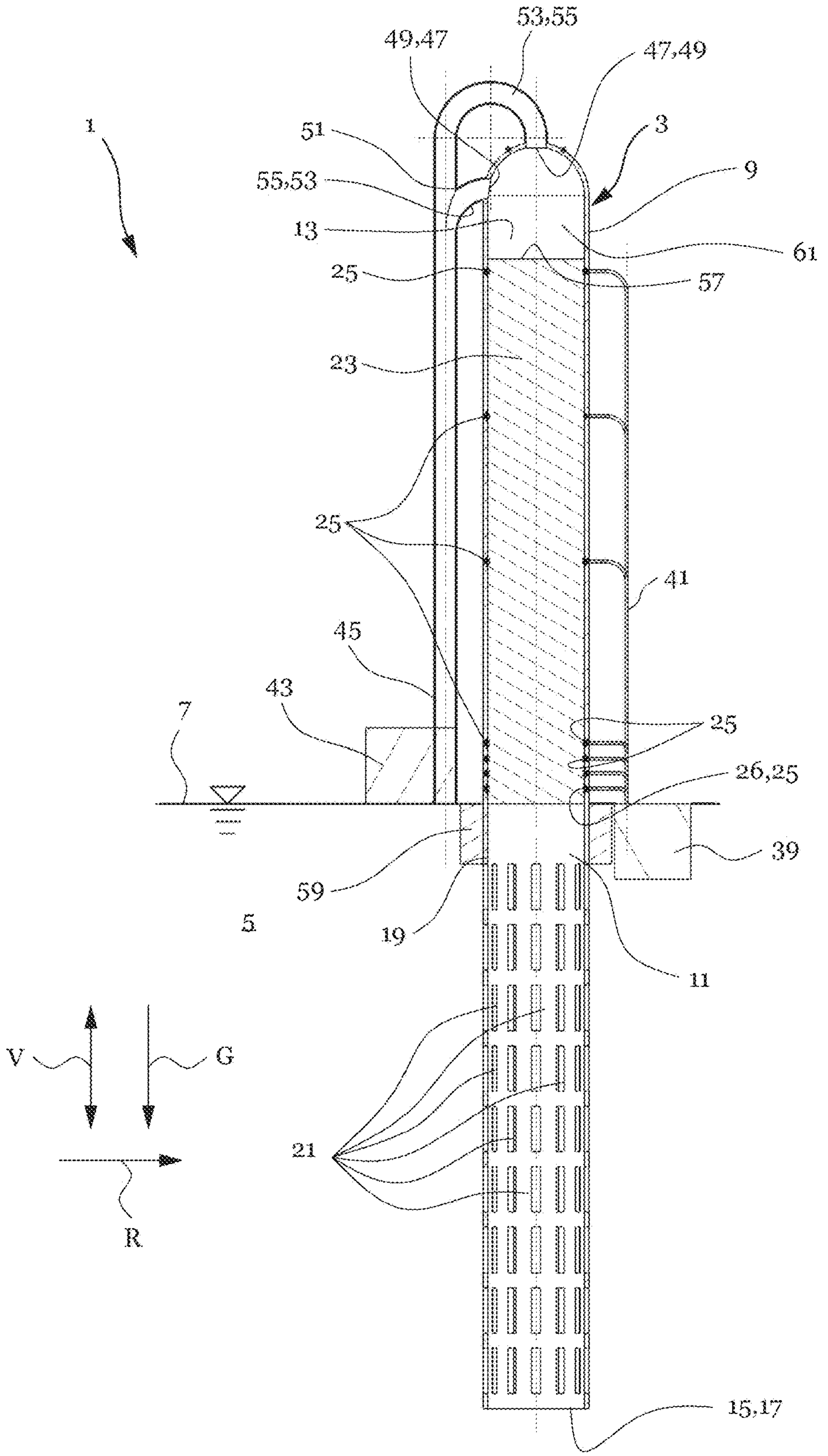
Figure 7:
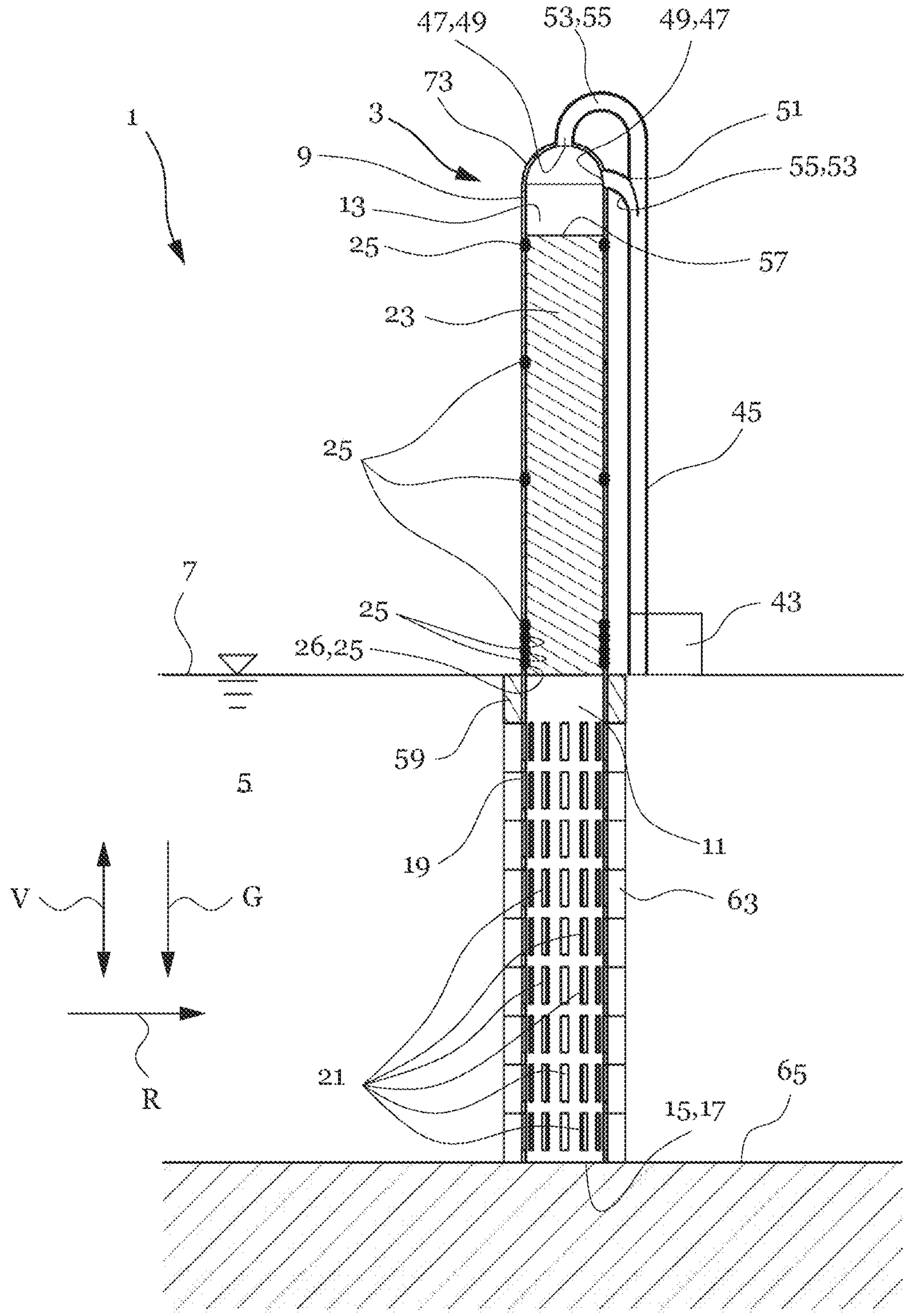
Figure 8:
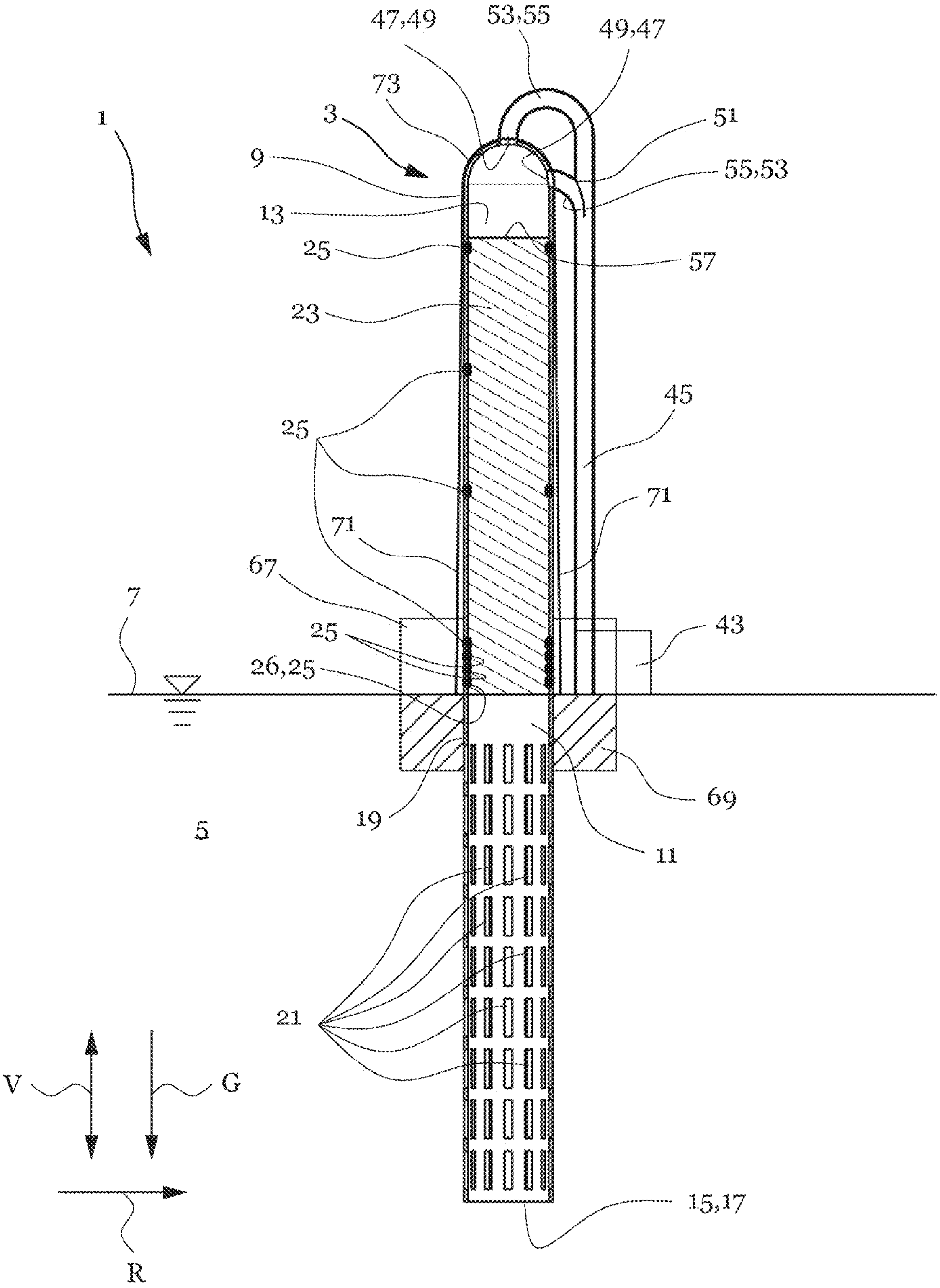
Figure 9:
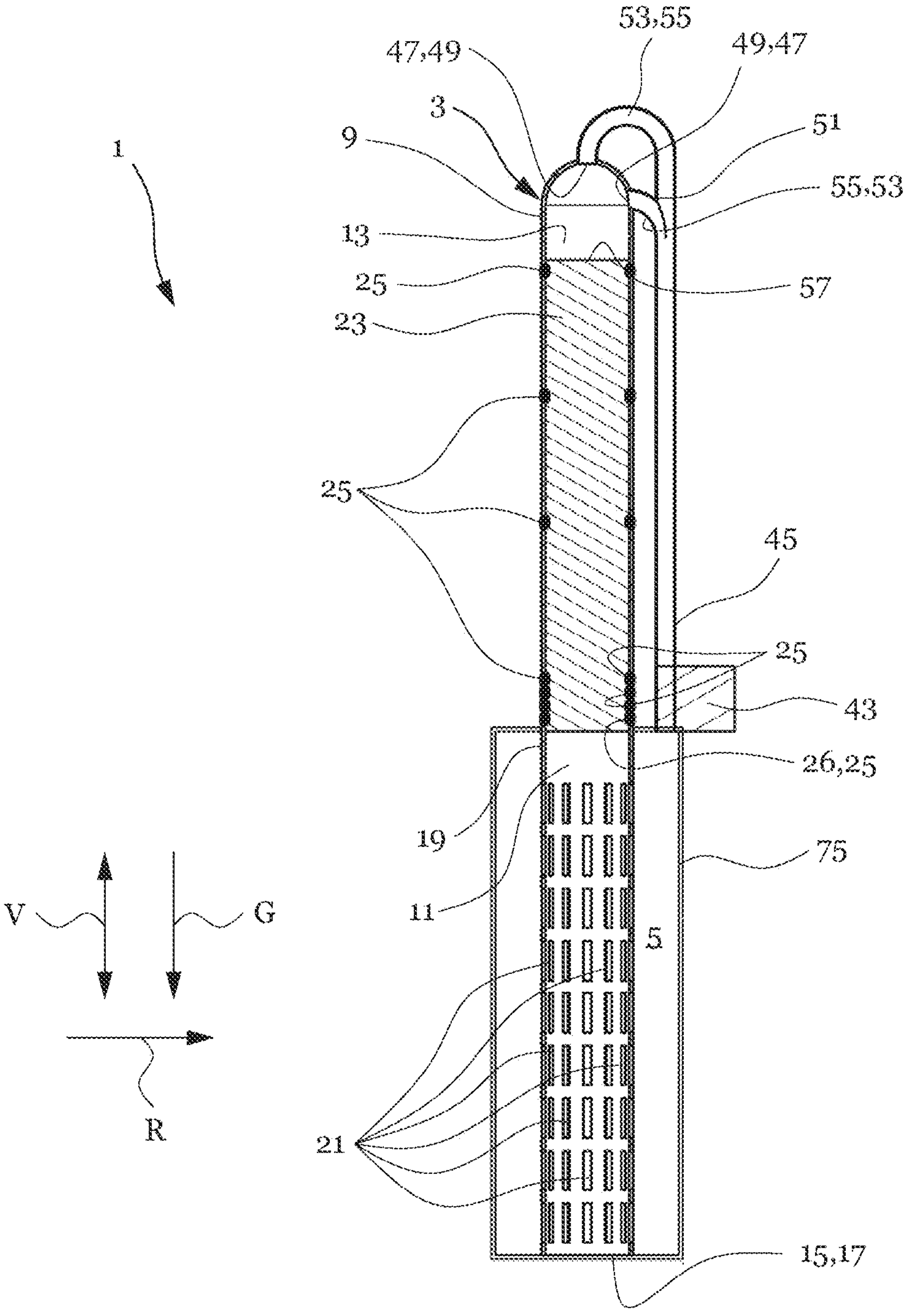
Figure 10:
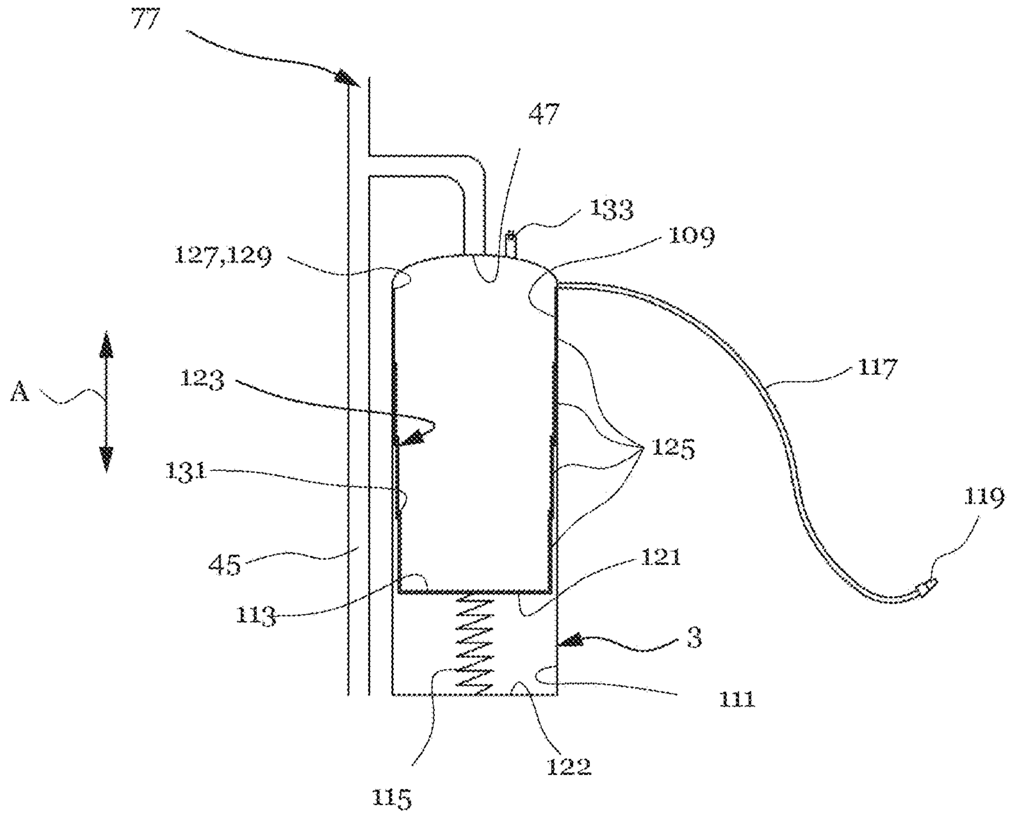
Figure 11:
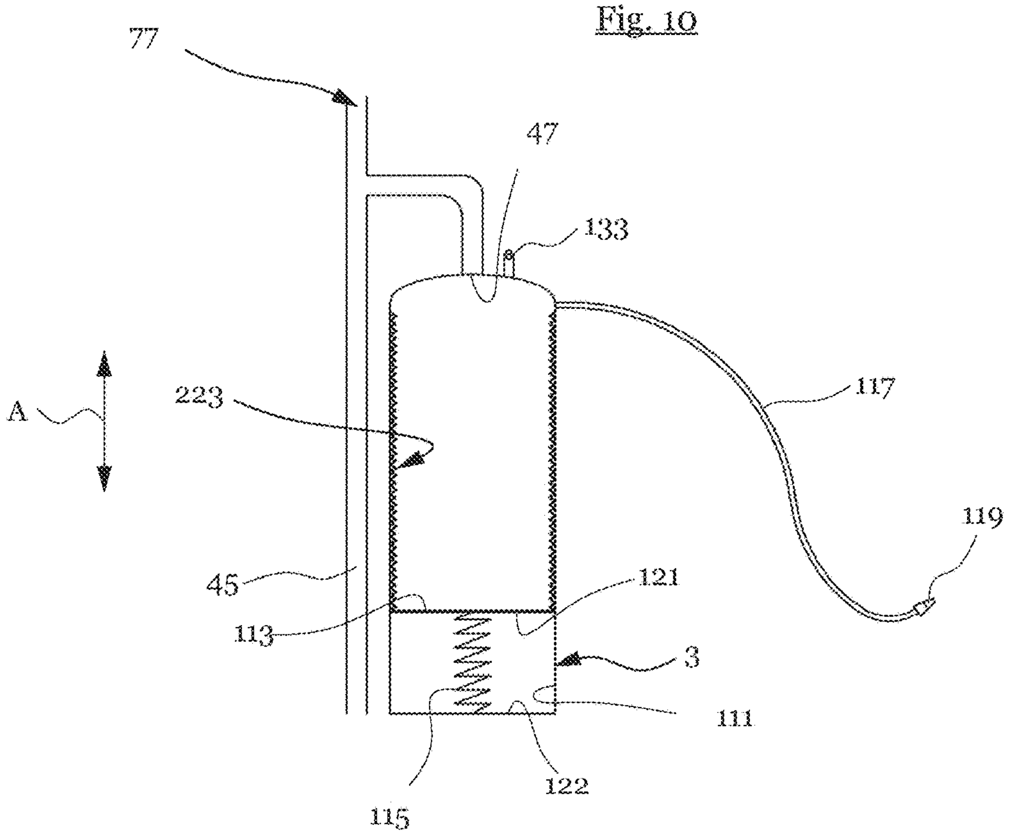
Figure 12:
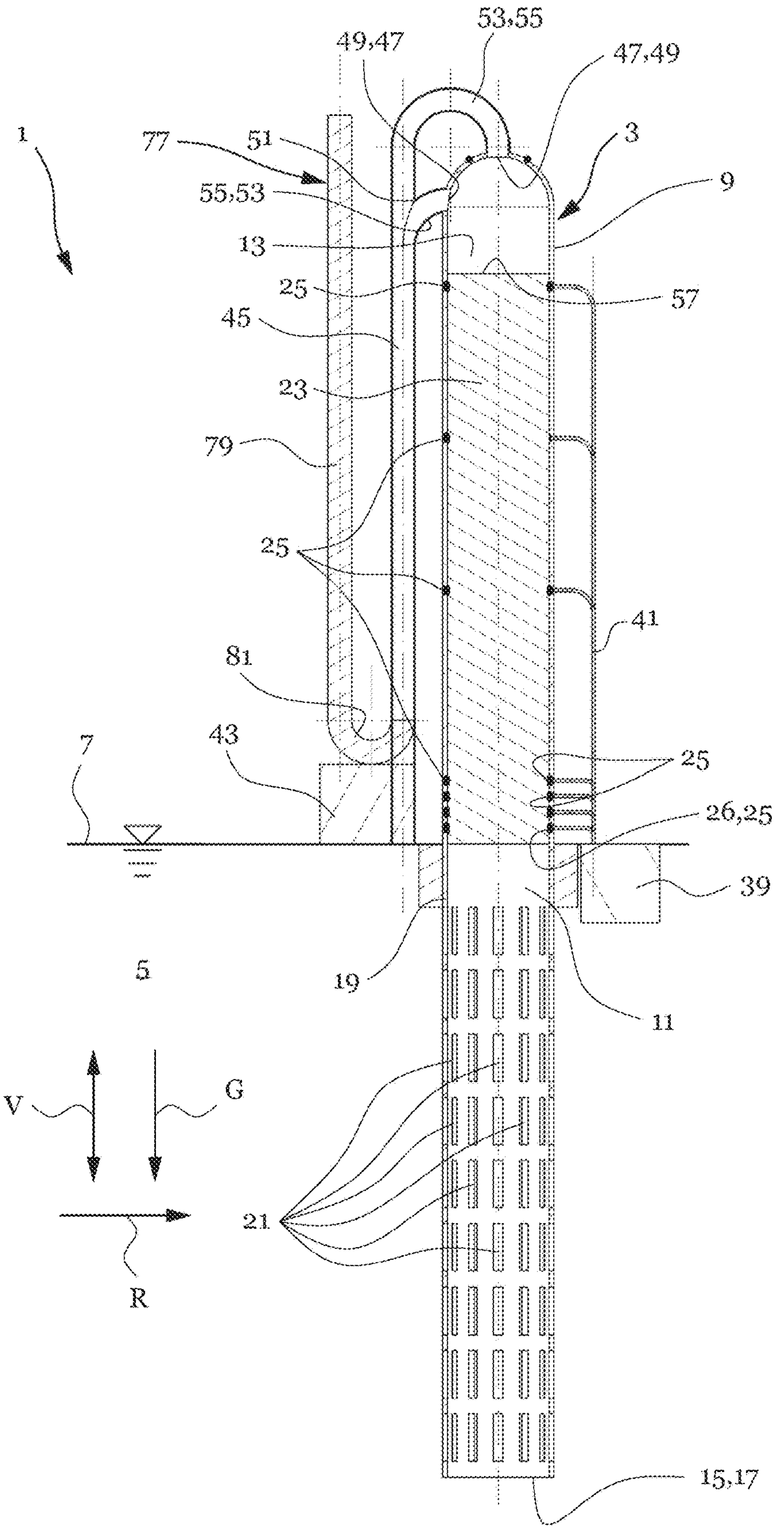
Figure 13:
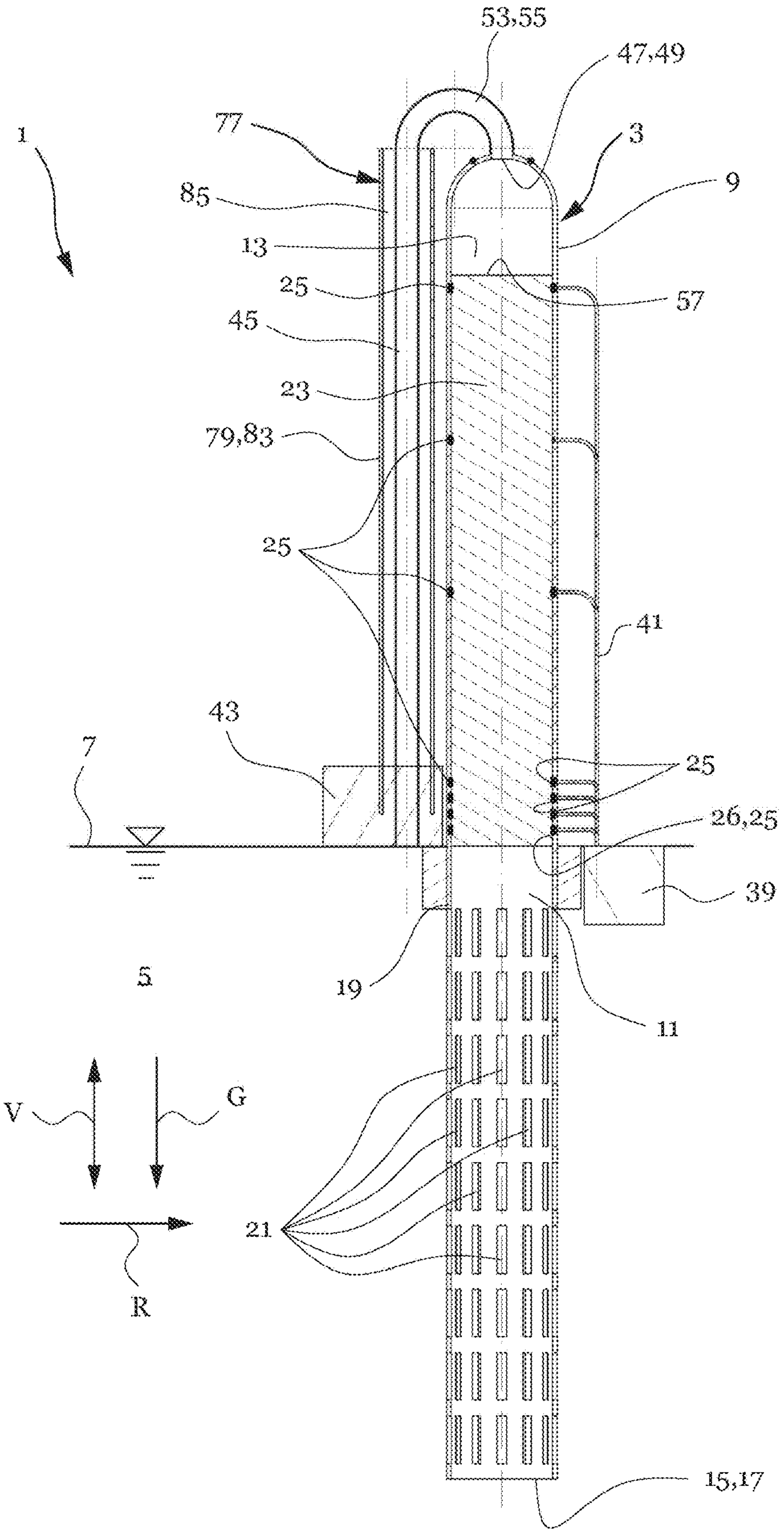

FIG. 1 a schematic sectional view of a pumped-storage power plant according to an exemplary embodiment the disclosure;

FIG. 2 a detailed sectional view of the section II indicated in FIG. 1;

FIG. 3 a detailed sectional view of the section III indicated in FIG. 1;

FIG. 4 a further sectional view of the pumped-storage power plant according to FIG. 1 in a further operating position;

FIG. 5 a further sectional view of the pumped-storage power plant according to FIG. 1 in a further operating position;

FIG. 6 a further schematic sectional view of a pumped-storage power plant according to an exemplary embodiment the disclosure;

FIG. 7 a further schematic sectional view of a pumped-storage power plant according to an exemplary embodiment the disclosure;

FIG. 8 a further schematic sectional view of a pumped-storage power plant according to an exemplary embodiment the disclosure;

FIG. 9 a further schematic sectional view of a pumped-storage power plant according to an exemplary embodiment the disclosure;

FIG. 10 a further schematic illustration of a pumped-storage power plant according to an exemplary embodiment the disclosure;

FIG. 11 a further schematic illustration of a pumped-storage power plant according to an exemplary embodiment the disclosure;

FIG. 12 a further schematic illustration of a pumped-storage power plant according to an exemplary embodiment the disclosure; and FIG. 13 a further schematic sectional view of a pumped-storage power plant according to an exemplary embodiment the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to overcome the disadvantages of the known prior art, in particular to provide an efficient pumped-storage power plant, a method for operating a pumped-storage power plant and a pumped-storage system which is readily scalable in terms of its design so that it can also be used for high energy-storage capacities and which is less susceptible to faults.

A pumped-storage power plant is accordingly provided. A pumped-storage power plant is generally an energy storage that stores energy in the form of potential energy which can be made available again in the form of electrical energy. It can in particular be provided that the electrical energy to be stored is used to build up a high energy potential, wherein the electrical energy is first converted into kinetic energy of the working fluid used and finally into potential energy. In order to be able to use the stored energy again when necessary, the process is carried out in reverse, i.e. the stored potential energy of the working fluid is first converted into kinetic energy and finally into electrical energy. The pumped-storage power plant according to the disclosure can be configured as an onshore pumped-storage power plant for use or installation on land or as an offshore pumped-storage power plant for use or installation in a body of water, such as the sea.

The pumped-storage power plant according to an exemplary embodiment of the disclosure comprises a working cylinder partially submerged in a working fluid reservoir, such as a water storage, for example a rainwater tank, or a body of water, such as a lake or a sea, the working cylinder comprising an upper fluid compartment essentially above a fluid level of the working fluid reservoir and a lower fluid compartment essentially below the fluid level. The working cylinder is not limited to a specific geometric shape and/or dimensioning. A round, preferably circular, cross-sectional shape has proven to be advantageous, in particular with regard to the effects of hydrostatic pressure. With regard to the amount of energy to be stored, as far as the working cylinder is concerned, its volume has been identified as the decisive influencing factor, which depends in particular on the height of the working cylinder and its diameter. In particular, the height of the working cylinder is decisive for the amount of potential energy to be stored per unit of volume, wherein the amount of potential energy to be stored, which can also be called the storage capacity, scales quadratically with a change in the height of the working cylinder. Furthermore, the internal volume of the working cylinder, i.e. its storage capacity, also scales quadratically with its radius. There is thus an effort to provide the largest possible working cylinder dimensions, in particular working cylinder heights and/or working cylinder diameters. The working cylinder is partially submerged in a working fluid reservoir so that an upper fluid compartment is essentially above the fluid level of the working fluid reservoir and protrudes from the working fluid reservoir in order to provide a storage capacity in the upper fluid compartment. The lower fluid compartment next to the upper fluid compartment and located below the fluid level, and thus submerged in the working fluid reservoir, can be arranged in fluid communication with the working fluid reservoir, wherein a fluid level outside the working cylinder essentially corresponds to the fluid level inside the working cylinder which separates the upper fluid compartment from the lower fluid compartment.

The pumped-storage power plant according to an exemplary embodiment of the disclosure also comprises a buoyant piston, which is movably guided relative to the working cylinder in the direction of gravity and seals off the upper fluid compartment vis-à-vis the lower fluid compartment in such a manner that a gravitationally induced exchange of fluid between the upper fluid compartment and the lower fluid compartment is prevented. The buoyant piston is, for example, a hollow body, in particular a hollow cylinder, the shape and/or dimensioning of which is adapted, for example, to an internal dimension of the working cylinder, in particular adapted in such a manner that it separates the upper fluid compartment from the lower fluid compartment in a fluid-tight manner. For example, the buoyant piston can be made of a material that has a lower density than the working fluid located and/or to be stored in the working fluid reservoir. For example, plastics are possible, which can consist in particular of so-called plastic waste. Regardless of the material selected and the working fluid used, it must be ensured that the buoyant piston generates a buoyant force relative to the working fluid arranged in the working fluid reservoir, said buoyant force preferably having an opposite orientation relative to the direction of gravity acting on the buoyant piston. It can be provided in this connection that the working cylinder is essentially closed and/or sealed off from the surrounding area so that working fluid introduced into the upper fluid compartment does not unintentionally escape from the upper fluid compartment.

During an energy charging mode of the pumped-storage power plant, working fluid is introduced into the upper fluid compartment. For example, volatile fluids, such as helium, or a liquid, such as water, are employed as working fluids. During the energy charging mode, under the influence of its weight force and/or the hydrodynamic pressure of the upper fluid introduced into the upper fluid compartment, the buoyant piston is submerged into the lower fluid compartment relative to the fluid level. In an example embodiment of the present disclosure, working fluid is continuously introduced into the upper fluid compartment in order to fill the same, the working fluid let in or introduced into the upper fluid compartment being designated as upper fluid. During the continuous introduction of the upper fluid into the upper fluid compartment, a fluid column, in particular an upper fluid column, builds up in the upper fluid compartment. The volume of the upper fluid column depends here on an internal dimension of the outer cylinder, in particular of the upper fluid compartment, as well as on the height of the upper fluid column building up against the direction of buoyancy of the buoyant piston and in the direction of gravity, which produces a weight force on the buoyant piston. The buoyant piston continuously lowered into or submerged in the lower fluid compartment, in particular the immersed or submerged section of the buoyant piston, can essentially correspond in its longitudinal dimension to a height of the upper fluid column or change according to a change in the height of the upper fluid column. For example, under the influence of the hydrostatic pressure, also called gravitational pressure, of the upper fluid, the buoyant piston is submerged into the lower fluid compartment as a result of the influence of gravity. Additionally or alternatively, a hydrodynamic pressure of the introduced upper fluid resulting from the kinetic energy of the inflowing upper fluid and depending in particular on the flow velocity and density of the inflowing upper fluid can be used to submerge the buoyant piston into the lower fluid compartment.

In an exemplary embodiment, the pumped-storage power plant further comprises an energy delivery mode in which upper fluid is pressed out of the upper fluid compartment under the influence of the buoyant force of the buoyant piston and/or in which a fluid column, in particular the upper fluid column, of the upper fluid built up during the energy charging mode is discharged from the upper fluid compartment, preferably at a constant rate. The energy delivery mode can, for example, be designed in such a manner that the buoyant piston is moved out of the lower fluid compartment in the direction of the upper fluid compartment, preferably under the sole influence of the buoyant force against the direction of gravity, so that the upper fluid is at least partially pressed out of the upper fluid compartment. The pressed-out upper fluid can determine a water column, the height of which is determined by a displacement of the buoyant piston in the direction of buoyancy. The energy delivery mode can also be designed in such a manner that the built-up column of upper fluid is let out or can flow out of the upper fluid compartment at a preferably constant rate, wherein it can be provided that the discharged working fluid having left the upper fluid compartment draws the remaining upper fluid still arranged in the upper fluid compartment after it, wherein in particular the portion of working fluid that has been discharged can develop a suction effect vis-à-vis the upper fluid still arranged in the upper fluid compartment. As a result of the upper fluid flowing out of the upper fluid compartment, a weight force of the upper fluid acting on the buoyant piston against its direction of buoyancy is reduced, so that a buoyant force of the buoyant piston relative to the working fluid reservoir at least briefly exceeds the weight force of the upper fluid, whereby the buoyant piston is displaced against the direction of gravity and thus in the direction of buoyancy.

In an exemplary embodiment, the pumped-storage power plant can, for example, be designed in such a manner that the weight force of the upper fluid essentially corresponds to a buoyant force of the buoyant piston so that the buoyant piston is in equilibrium. According to a further embodiment, the equilibrium between the buoyant force of the buoyant piston and the weight force of the upper fluid is only suspended in the phases of transition between an energy delivery mode and an energy charging mode. For example, the pumped-storage power plant is set up in such a manner that at a moment of demand at which the stored potential energy is to be made available again, which is provided in the form of the upper fluid arranged within the upper fluid compartment and the buoyant piston submerged in the working fluid reservoir, upper fluid is at least partially discharged or pressed out. The temporarily superior buoyant force of the buoyant piston causes it to at least partially re-emerge from the lower fluid compartment until an equilibrium between the weight force of the upper fluid compartment and the buoyant force of the buoyant piston is re-established by the buoyant piston coming to a standstill, i.e. no longer being displaced between the upper fluid compartment and the lower fluid compartment. According to the pumped-storage power plant according to the disclosure, the stored potential energy is essentially entirely available for a conversion back into electrical energy when required. Due to the simple configuration of the present disclosure, the pumped-storage power plant can be readily scaled in any desired manner so that any desired storage capacities can be realized in a simple manner according to the specific application, preferably by simply scaling the pumped-storage power plant. Furthermore, the division of the working cylinder into an upper fluid compartment and a lower fluid compartment has proven to be advantageous with regard to the reduced amount of space required for its installation in the area of the lower fluid compartment. Furthermore, the exploitation of the buoyant force and the weight force according to the present disclosure enhances the efficiency of the pumped-storage power plant, since not much energy is required in particular during the storage process, i.e. when the energy charging mode is adopted, and/or the device used for the storage process requires a low energy delivery power.

According to an exemplary embodiment of the present disclosure, at least one seal is arranged between the buoyant piston and the working cylinder, preferably in the area of the fluid level, for sealing the upper fluid compartment vis-à-vis the lower fluid compartment. For example, a group of a plurality of seals can be arranged in the area of the fluid level in order to provide an improved sealing and a redundancy, for example, in the event of the failure of a seal. It can further be provided that the at least one seal, or at least one further seal, is arranged on the upper fluid compartment in the middle area or in the upper half of the same relative to its longitudinal extension. In a further example embodiment, the at least one seal can be activated so as to hold the buoyant piston in place relative to the working cylinder, preferably in the energy charging mode and/or in the energy delivery mode of the pumped-storage power plant. For example, when the seal is activated, a holding force is built up between the buoyant piston and the working cylinder. The at least one seal can, for example, be activatable in such a manner that the holding force between the working cylinder and the buoyant piston is preferably adjustable in a continuous manner. In an operating mode in which the at least one seal is deactivated, the frictional force between the buoyant piston and the working cylinder can essentially be nullified or a certain frictional force can be maintained during the displacement of the buoyant piston relative to the working cylinder. The seal can be activated, for example, by exposing the seal pneumatically and/or hydraulically. For example, the at least one seal is designed as a hollow seal and/or has a cavity extending through it at least in sections, which can be exposed with a hydraulic medium or pneumatically in order to activate or deactivate the seal. The at least one seal respectively its activation can be realized in such a manner that, in order to activate the seal, hydraulic medium or air is introduced into the hollow seal, in particular its cavity, in order to activate it. To deactivate the seal, the hydraulic medium or air is removed from the at least one seal, i.e. its cavity. According to a further embodiment, other principles for activating the seal can be implemented such as a piezoelectric or an electromagnetic activation. For example, it can be provided that each seal can be activated individually, in particular activated individually by hydraulic and/or pneumatic, electromechanical or piezoelectrical means. According to an example embodiment, the at least one seal is arranged circumferentially around the buoyant piston or on an inner wall of the working cylinder. Alternatively, the at least one seal can be realized and/or arranged in such a manner that it is not circumferential. In this connection, it has proven advantageous, in particular in order to prevent leakage losses between the upper fluid compartment and the lower fluid compartment, to arrange a plurality of seals, which are not designed to be circumferential, so as to be staggered in relation to one another, in the manner of a labyrinth seal, wherein staggered can be understood to mean that two adjacent seals respectively partially overlap when viewed in the direction of displacement of the buoyant piston and partially protrude beyond one another in the circumferential direction. The profile of the at least one seal is not limited to a specific shape. Furthermore, a wide variety of materials are potentially suitable. According to a further example embodiment of the present disclosure, the at least one seal can hold the buoyant piston in place relative to the working cylinder by means of a material-based, force-based and/or form-based locking principle. In particular the form-based connecting force has proven to be advantageous in terms of a stabilization of the pumped-storage power plant in its energy charging mode (storage state).

According to a further exemplary embodiment of the pumped-storage power plant according to the disclosure, the at least one seal is accommodated in a groove formed in an inner jacket surface of the working cylinder and/or an outer jacket surface of the buoyant piston. For example, the at least one seal is accommodated in the groove on the side of the working piston so that the at least one seal moves with the buoyant piston when the buoyant piston is displaced, in particular between the upper fluid compartment and the lower fluid compartment. If the at least one seal is accommodated in the groove on the side of the working cylinder, the at least one seal does not move with the buoyant piston as a result of a displacement of the buoyant piston, in particular between the lower fluid compartment and the upper fluid compartment, and/or is arranged so as to be essentially stationary. For example, the at least one seal is realized in such a manner that, when activated, it expands in the direction of the buoyant piston and/or the working cylinder in order to build up, preferably in a continuous manner, a holding force such as a frictional force and/or a form-fitting force, between the buoyant piston and the working cylinder. By preventing the at least one seal on the side of the buoyant piston or on the side of the working cylinder from expanding preferably in a radial direction relative to the buoyant piston or working cylinder, respectively, the at least one seal expands in the respectively other radial direction when it is activated, in particular so as to press itself into the intermediate space between the buoyant piston and the working cylinder, thus forming a holding force. In an example embodiment of the present disclosure, guide rollers can be arranged, for example, in the form of roller rings on the side of the outer cylinder and/or on the side of the buoyant piston, on which the buoyant piston and/or the working cylinder can roll when the buoyant piston is displaced between the upper fluid compartment and the lower fluid compartment. This allows a reduction of wear on the pumped-storage power plant according to the disclosure, in particular wear resulting from the relative movement of the buoyant piston and the working cylinder. The improved tribological characteristics achieved thereby also enhance the efficiency of the system. According to a further example embodiment, further measures can be provided to improve the tribological characteristics of the pumped-storage power unit, such as further measures for reducing wear and/or friction, e.g., a lubrication, a selection of specific materials and/or coatings. For the arrangement of the guide rollers on the side of the buoyant piston and/or on the side of the working cylinder, corresponding grooves can be formed on the side of the buoyant piston and/or on the side of the working cylinder, in which the corresponding guide rollers are arranged. It has proven advantageous, in a configuration with seals on the side of the working cylinder, to also arrange the guide rollers on the side of the working cylinder, and vice versa, in order to prevent a collision between the seal and the guide rollers, which can lead to damage to the at least one seal and/or the guide rollers. The inventors of the present disclosure have discovered that the use of guide rollers, in particular roller rings, results in an preferably uniform and/or circumferential annular gap between the buoyant piston and the working cylinder, which renders the activation, preferably the control, of the at least one seal easier and/or more precise. According to a further example embodiment, an air cushion can be provided as an alternative or in addition to the at least one seal in order to seal the lower fluid compartment vis-à-vis the upper fluid compartment. The air cushion can be realized, for example, by enclosing a preferably predetermined air cushion section in which a volatile medium is pressurized. Leaking fluid between the upper fluid compartment and the lower fluid compartment would have to overcome or bypass the pressurized volatile medium forming the air cushion in addition to the at least one seal in order to get into the lower fluid compartment. This measure has proven to be particularly preferred with regard to the longevity of the pumped-storage power plant according to the disclosure.

In an exemplary embodiment of the present disclosure, an activation of the at least one seal, preferably for holding the buoyant piston in place and/or releasing the buoyant piston relative to the working cylinder, and a displacement of the buoyant piston between the energy charging mode position and the energy delivery mode position are coordinated. For example, it can be provided that a relative movement of the buoyant piston in relation to the working cylinder is preferably realized solely by activation or deactivation, preferably controlling, of the at least one seal. For example, the activation of the at least one seal and the displacement of the buoyant piston are coordinated in such a manner that a frictional force between the buoyant piston and the working cylinder is preferably adjustable in a continuous manner during the displacement of the buoyant piston, wherein in particular the acting frictional force correlates with the expansion/contraction of the at least one seal resulting from an activation of the seal.

In a further exemplary embodiment of the pumped-storage power plant according to the disclosure, an activation power source, e.g., a pneumatic, electronic and/or hydraulic source, is fluidly and/or electrically connected to the at least one seal. The at least one seal can thus be activated or deactivated, in particular exposed with activation fluid and/or supplied with current. According to a further example embodiment, the activation power source 39 is coupled to a control and/or regulating device (e.g. controller 40, FIG. 1) configured to control and/or regulate the activation power source 39, in particular for activating or deactivating the at least one seal, preferably in an automated manner. In an exemplary embodiment, the controller 40 includes processing circuitry that is configured to perform one or more functions of the controller 40, including controlling the operation of the pumped-storage power plant, controlling and/or regulating the activation power source 39 and/or one or more other components of the pumped-storage power plant, and/or performing one or more other functions as would be understood by one of ordinary skill in the art. The controller 40 may be connected to the activation power source 39 via a wired and/or wireless connection. Although not illustrated, the controller 40 may be additionally connected to one or more other components of the power plant. In the sense of the present disclosure, control is understood to mean that the behavior of the at least one seal and thus of the pumped-storage power unit is systematically influenced, in particular by controlling the activation or deactivation of the at least one seal, preferably in order to hold the buoyant piston in place or release the same relative to the working cylinder. Regulating in the present context is understood to mean that a variable, namely the regulated variable such as, e.g., a pressure inside the seal, is continuously or periodically captured and compared with a setpoint variable, the reference variable, such as, e.g., a predetermined setpoint pressure, and the regulated variable is adjusted or influenced based on the comparison between the regulated variable and the reference variable. For example, the power required to activate or deactivate the at least one seal can be provided by means of a connection to a power grid that is preferably separate from the pumped-storage power plant. Furthermore, it is possible that at least part of the power required for said activation or deactivation is diverted from part of the energy to be stored. For example, part of the energy to be stored can be temporarily stored, e.g. in a hydraulic accumulator or a compressed air accumulator, in order to make this part of the energy to be stored available for a subsequent activation or deactivation of the at least one seal. For example, it has thus been discovered that an external power supply can be omitted and that the pumped-storage power plant can supply itself for the activation or deactivation of the at least one seal, whereby a flexible usage of the pumped-storage power plant is rendered possible even at places which are not hooked up to a power supply.

According to a further exemplary embodiment of the present disclosure, at least one preload seal seals the buoyant piston and the working cylinder vis-à-vis one another at an end of the buoyant piston that faces away from the lower fluid compartment. This means that the preload seal can be arranged on an upper end section of the buoyant piston or of the upper fluid compartment when viewed in the direction of gravity. It is clear that the at least one preload seal can be structured analogously to the at least one seal and/or be arranged on the pumped-storage power plant, in particular on an inner jacket surface of the working cylinder and/or an outer jacket surface of the buoyant piston. The at least one preload seal can be operated in such a manner that, in the energy charging mode position of the buoyant piston, it is activated in order to build up a predetermined upper fluid column, in particular activated in such a manner that the weight force of the upper fluid continuously exceeds the buoyant force of the buoyant piston relative to the working fluid during the displacement of the buoyant piston to a final energy charging mode position. In other words, the preload seal serves to initially build up a predetermined upper fluid column in the energy charging mode of the pumped-storage power plant without allowing a gravitationally induced movement of the buoyant piston into the lower fluid compartment. The preload seal is thus initially activated until a predetermined upper fluid column has accumulated in the upper fluid compartment above the buoyant piston while the buoyant piston is held in place relative to the working cylinder. During the build-up of the upper fluid column, the weight force of the upper fluid acting on the buoyant piston against the direction of buoyancy of the latter, in particular the weight force of the rising upper fluid column, increases essentially continuously. As soon as a predetermined upper fluid column has been built up and/or a predetermined weight force of the upper fluid column is provided, the preload seal is controlled, in particular deactivated, in order to reduce the holding force acting between the buoyant piston and the working cylinder for holding the buoyant piston in place so that the buoyant piston is submerged into the lower fluid compartment relative to the fluid level in the direction of gravity as a result of the upper fluid column that has built up, the weight force of which exceeds the buoyant force of the buoyant piston. The buoyant piston is preferably set in motion in an abrupt manner when the preload seal is deactivated. This makes it possible to achieve a high dynamic for the pumped-storage power plant. This also has an advantageous effect in terms of the energy required to introduce the upper fluid into the upper fluid compartment, as it is merely necessary to overcome the potential energy, for example resulting from a difference in elevation between the upper fluid compartment and the fluid reservoir.

In an exemplary embodiment of the present disclosure, the buoyant piston and/or the working cylinder is coupled to at least one auxiliary body arranged outside the working cylinder and at least partially submerged in the working fluid reservoir, for example a floating body, submersion body, equalizing body and/or buoyant body, preferably in any number and of any shape and/or attachment type. The coupling can, for example, occur via a cable structure, which is attached to the at least one auxiliary body on one side and to the buoyant piston on the other. The cable structure can, for example, be guided over the working cylinder, for example by means of rollers, so that the forces acting between the auxiliary body and the buoyant piston can be attenuated on the working cylinder. In particular, the at least one auxiliary body is used to equalize or absorb forces acting on the pumped-storage power plant, especially in the free-floating configuration of the working cylinder in the working fluid reservoir. The auxiliary body can be configured to transmit a force component to the buoyant piston, said force component being directed opposite to the weight force of the upper fluid, wherein in particular the force component counteracts a displacement of the buoyant piston from the energy delivery mode position into the energy charging mode position, i.e. from the upper fluid compartment downwards relative to the fluid level into the lower fluid compartment. The provision of at least one auxiliary body has also proved to be advantageous in particular when the pumped-storage power plant is designed in such a manner that the buoyant force of the buoyant piston exceeds the weight force of the introduced upper fluid being directed opposite to the buoyant force. An increased energy-storage capacity can be realized with this configuration. In this configuration, more energy is initially required in order to submerge the buoyant piston in the lower fluid compartment, i.e. in order to convey it into the energy charging mode position, since the excess buoyancy must be overcome by providing a supplementary force such as a hydraulic pressure force. The additional energy used is likewise reversibly available in the energy delivery mode of the pumped-storage power plant, which can then also be converted into electrical energy so that the electrical energy provided in the energy delivery mode can be increased. According to a further example embodiment in which the working cylinder is arranged so as to be free-floating, i.e. without a mooring in a floor of the fluid reservoir in which the working fluid reservoir is arranged, the working cylinder is coupled to at least one floating body preferably located outside the working cylinder and at least partially submerged in the working fluid reservoir. This has been found to promote a stabilization of the pumped-storage power plant with respect to its floating arrangement in the working fluid reservoir in such configurations. This means that the forces acting on the pumped-storage power plant as a result of alternations between the energy charging mode and the energy delivery mode can be better compensated.

According to an exemplary embodiment of the present disclosure, the pumped-storage power plant comprises a pump-turbine unit, also called a pump turbine, for providing the energy required for adopting the energy charging mode and for receiving the energy delivered in the energy delivery mode. For example, the pump-turbine unit is arranged outside the working fluid reservoir and/or above the fluid level. There is thus no hydrostatic resistance, for example, at a turbine outlet of the pump-turbine unit, but only atmospheric pressure, so that less power is lost. Furthermore, this type of arrangement is characterized by better maintenance access, as well as a significantly easier acoustic decoupling vis-à-vis the working fluid reservoir. The pump-turbine unit can be designed to pump working fluid into the upper fluid compartment in the energy charging mode, preferably from the working fluid reservoir in which the working cylinder is located or from a separate working fluid reservoir. According to a further example embodiment, the pumped-storage power plant can comprise at least one equalizing body, which floats in the working fluid reservoir and/or is partially submerged in the working fluid reservoir, wherein in particular the equalizing body is configured to attenuate or compensate the forces acting on the pumped-storage power plant during operation of the pump-turbine unit. According to an alternative embodiment that can be combined with the previously described embodiment, a separate pump can be connected to the pumped-storage power plant instead of the pump-turbine unit and the pumped-storage power plant can be coupled to a further, separate energy conversion device that converts the stored potential energy back into electrical energy in the energy delivery mode. For example, containers can be filled with the upper fluid pressed out or discharged from the upper fluid compartment in the energy delivery mode and coupled to a generator via a chain/belt assembly in order to convert the weight force of the pressed-out or discharged upper fluid into torque that the generator can use to generate electricity. For example, the pump-turbine unit can comprise at least one pump storage cylinder. It is further conceivable that a plurality of pump storage cylinders are fed by a pump-turbine unit. Thereby, it can be provided that the pumped storage cylinders are fed in parallel or sequentially. By reducing the components of the pumped-storage power plant according to the disclosure, costs can be saved. For example, an annular arrangement of the plurality of pump storage cylinders relative the single pump-turbine unit is possible.

In a further exemplary embodiment of the pumped-storage power plant according to the disclosure, the pump-turbine unit is configured to be operable in a generator mode when the energy delivery mode is adopted. Flow energy of the upper fluid pressed out of and/or discharged from the upper fluid compartment can thus be converted into mechanical energy in the energy delivery mode, which can preferably be used to drive a current generator. As mentioned above, further energy conversion devices can be coupled to the pumped-storage power plant in order to convert the stored potential energy into electrical energy, in particular electricity. For example, the pump-turbine unit can be arranged in such a manner that there is predominantly an essentially vertical direction of flow between the working fluid reservoir and the working cylinder and/or between the pump and the turbine. It is further possible to provide an essentially horizontal direction of flow. With this arrangement, it has proven advantageous that it is not necessary to overcome any gravitational forces, although the acceptance of flow losses has to be accepted.

According to an exemplary embodiment of the present disclosure, the working cylinder, in particular the upper fluid compartment, is closed or at least partially open on a side that faces away from the lower fluid compartment. For example, the working cylinder can be sealed off from the surrounding area, in particular in a fluid-tight manner, by means of a cover. For example, the working cylinder sealed off from the surrounding area, in particular the cover, can be used to facilitate the adoption of the energy charging mode, since a hydraulic pressure can be built up inside the working cylinder, in particular inside the upper fluid compartment, which is realized between the jacket surfaces of the working cylinder, the buoyant piston and the end, in particular the cover, of the working cylinder in the upward direction towards the surrounding area. Furthermore, it is an advantage that the working cylinder, in particular the upper fluid compartment, is designed to be fluid-tight vis-à-vis the surrounding area so that the buoyant piston is subjected in the energy delivery mode not only to the buoyant force but also to a suction force created by the upper fluid flowing out of, i.e. being discharged from, the upper fluid compartment, whereby in particular the efficiency of the pumped-storage power plant is improved along with the dynamics, in particular the responsiveness of the pumped-storage power plant. Moreover, the so-called stick-slip phenomenon is prevented between the buoyant piston and the working cylinder, which can lead to an uneven outflow or discharge of the upper fluid from the upper fluid compartment in the energy delivery mode. Furthermore, the cover can assume a load-bearing function, for example for guiding or supporting the cable structure for mounting the auxiliary bodies. In the event that the working cylinder, in particular the upper fluid compartment, is at least partially, preferably completely, open, i.e. relative to an outer dimension of the working cylinder, the upper fluid can be obtained, for example, from rainwater which can drop into the upper fluid compartment through the working cylinder, which is open to the surrounding area. By filling the upper fluid compartment with rainwater, the efficiency of the pumped-storage power plant can be increased, as no energy is needed to fill the upper fluid compartment.

In an exemplary embodiment of the pumped-storage power plant according to the disclosure, the working cylinder is arranged so as to be free-floating in the working fluid reservoir or is firmly moored in a floor of the working fluid reservoir. The working cylinder in the area of the lower fluid compartment can be designed in such a manner that an exchange of fluid with the working fluid reservoir is possible. For example, the lower fluid compartment is preferably completely open to the working fluid reservoir on a front side facing the working fluid reservoir. Furthermore, the lower fluid compartment can comprise a plurality of through-holes integrated in the jacket surfaces of the lower fluid compartment, through which an exchange of fluid between the lower fluid compartment and the working fluid reservoir is possible.

According to a further exemplary embodiment of the present disclosure, a buoyant force of the buoyant piston relative to the working fluid arranged in the working fluid reservoir is greater than the weight force of the upper fluid in a final energy delivery mode position of the buoyant piston for moving the buoyant piston to the energy charging mode position. The material of the buoyant piston, in particular its density, can be selected for the working fluid in the working fluid reservoir so as to realize the aforementioned condition. Additionally or alternatively, the material of the buoyant piston, in particular its density, can be selected for a size of the upper fluid compartment in the final energy delivery mode position of the buoyant piston so as to realize the aforementioned condition. According to a further example embodiment, the pump-turbine unit is configured to overcome the excess buoyant force, in particular in order to move the buoyant piston from the energy delivery mode position, in particular the final energy delivery mode position, in the direction of the lower fluid compartment, in particular in order to adopt the energy charging mode position.

According to an exemplary embodiment of the present disclosure, the pumped-storage power plant can comprise a surge tank, in particular in order to avoid flow-induced backflow in lines, in particular of the pump-turbine unit, which lines can be connected to the working cylinder. The surge tank is used, for example, to collect a falling column of upper fluid when the energy delivery mode is interrupted. According to the disclosure, this can be initiated, for example, by the following two measures. According to one option, at least one seal is activated in such a manner that the buoyant piston is held in place relative to the working cylinder. A further option is to control the pump-turbine unit in such a manner that the flow of working fluid through the pump-turbine unit is interrupted. For example, an inlet line is provided on the pump-turbine unit in order to let upper fluid flow into the upper fluid compartment and an outlet line is provided in order to let the pressed-out or discharged upper fluid flow out of the upper fluid compartment. In addition to the inlet and outlet lines, an equalization line can be provided into which the working fluid in the lines can flow in order to realize the measures described above, in particular in order to prevent working fluid from flowing through the turbine-pump unit. The flow-dependent pressure surges or pressure peaks that occur in the event of an interruption of the energy delivery mode can be compensated by flooding the equalization line with the working fluid and pumping the working fluid to a height against the direction of gravity at which a state of equilibrium is established. When the pump-turbine unit resumes operation, in particular when the pumped-storage power plant resumes the energy delivery mode, it is provided that the working fluid from the equalization line is supplied to the pump-turbine unit first before the latter is re-supplied with working fluid from the inlet or outlet line. For example, the equalization line can have a U-shaped design or be designed as a pipe-in-pipe structure in which the equalization line surrounds the inlet and outlet lines.

According to a further exemplary embodiment of the present disclosure, which can be combined with the preceding aspects and embodiments, a pumped-storage power plant is provided. A pumped-storage power plant is in general an energy storage that stores energy in the form of potential energy, which can be made available again in the form of electrical energy. It can in particular be provided that the electrical energy to be stored is used to build up a high energy potential, wherein the electrical energy is first converted into kinetic energy of the working fluid used before finally being converted into potential energy. In order to be able to use the stored energy again when the need arises, the process is carried out in reverse, i.e. the stored potential energy of the working fluid is first converted into kinetic energy before finally being converted into electrical energy. The pumped-storage power plant according to the disclosure can be configured as an onshore pumped-storage power plant for use or installation on land or as an offshore pumped-storage power plant for use or installation in a body of water, such as a sea.

In an exemplary embodiment, the pumped-storage power plant comprises a working cylinder with a working fluid compartment and a counter work compartment. The working cylinder is not limited to a specific geometric shape and/or dimensioning. A round, preferably circular, cross-sectional shape has proven to be advantageous, in particular with regard to occurring hydrostatic pressure effects. With regard to the amount of energy to be stored, as far as the working cylinder is concerned, its volume has been identified as the decisive influencing factor, which depends in particular on the height of the working cylinder and its diameter. In particular, the height of the working cylinder is decisive for the amount of potential energy to be stored per unit of volume, wherein the amount of potential energy to be stored, which can also be called the storage capacity, scales quadratically with a change in the height of the working cylinder. Furthermore, the internal volume of the working cylinder, i.e. its storage capacity, also scales quadratically with its radius. There is thus an effort to provide the largest possible working cylinder dimensions, in particular working cylinder heights and/or working cylinder diameters.

In an exemplary embodiment, the pumped-storage power plant also comprises a working piston, which is movable relative to the working cylinder in a working direction and seals off the working fluid compartment vis-à-vis the counter work compartment in such a manner that an exchange of fluid, in particular a gravitationally induced exchange of fluid, between the working fluid compartment and the counter work compartment is prevented. The buoyant piston is, for example, a hollow body, in particular a hollow cylinder, the shape and/or dimensioning of which is adapted, for example, to an internal dimension of the working cylinder, in particular adapted in such a manner that it separates the working fluid compartment from the counter work compartment in a fluid-tight manner. For example, the buoyant piston can be made of a material that has a lower density than counter working fluid potentially located in the counter work compartment and/or than the working fluid to be stored. For example, plastics are possible, which can consist in particular of so-called plastic waste.

In an energy charging mode in which fluid is introduced into the working fluid compartment so that, due to the effect of the fluid pressure—preferably due to the weight force of the introduced fluid—of the working fluid introduced into the working fluid compartment, the working piston is moved into the counter work compartment so that the working piston is tensioned, preferably so that an elastic component on the working piston is tensioned or so that the working piston is submerged in a counter working fluid filled into the counter work compartment. The energy to be stored is accordingly used to tension the working piston, i.e. the energy to be stored is used to perform work in order to tension the working piston. The working piston can, for example, be designed as a buoyant piston, analogously to the embodiment of the present disclosure described above, and have a buoyant force relative to the counter working fluid arranged in the counter work compartment, the direction of said buoyant force being directed opposite to a submersion of the buoyant piston in the counter working fluid.

In an exemplary embodiment, the pumped-storage power plant according to the disclosure further comprises an energy delivery mode in which working fluid is pressed out of the working fluid compartment under the influence of the tension force of the tensioned working piston and/or in which a fluid column of the working fluid built up during the energy charging mode flows out of the working fluid compartment, preferably at a constant rate. The pressed-out working fluid can determine a water column, the height of which is determined by a movement of the working piston in the working direction. The energy delivery mode can also be designed in such a manner that the built-up column of working fluid is let out or can flow out of the working fluid compartment at a preferably constant rate, wherein it can be provided that the discharged working fluid having left the working fluid compartment draws the remaining working fluid still arranged in the working fluid compartment after it, wherein in particular the portion of working fluid that has been discharged can develop a suction effect vis-à-vis the working fluid still arranged in the working fluid compartment. As a result of the working fluid flowing out of the working fluid compartment, a weight force of the working fluid acting on the working piston against the direction of the tension force is reduced, so that the tension force acting on the working piston briefly exceeds the weight force of the working fluid, whereby the working piston is moved against the direction of gravity and thus in the working direction.

According to the pumped-storage power plant according to an exemplary embodiment of the disclosure, the stored potential energy is essentially entirely available for a conversion back into electrical energy when required. Due to the simple configuration of the present disclosure, the pumped-storage power plant can be readily scaled in any desired manner so that any storage capacities can be realized in a simple manner according to the specific application, preferably by simply scaling the pumped-storage power plant. Furthermore, the division of the working cylinder into a working fluid compartment and a counter work compartment has proven to be advantageous with regard to the reduced amount of space required for its installation in the area of the counter work compartment. Furthermore, the exploitation of the buoyant force or the weight force according to the present disclosure enhances the efficiency of the pumped-storage power plant, since not much energy is required in particular during the storage process, i.e. when the energy charging mode is adopted, and/or the device used for storage process requires a low energy delivery power.

In a further exemplary embodiment of the present disclosure, the tensioning of the working piston occurs under the influence of the weight force of the working fluid. It can be provided, for example, that a working fluid column preferably accruing at a constant rate is built up in the working fluid compartment in the energy charging mode. It can be further provided that the pumped-storage power plant is arranged or oriented so that a direction of gravity is oriented in the direction of the displacement of the working piston, preferably opposite to the direction of displacement of the working piston. According to a further example embodiment, a tension force preferably being directed opposite to the direction of gravity builds up in the energy charging mode during the introduction of working fluid into the working fluid compartment, said tension force being directed opposite to a displacement of the working piston into the counter work compartment. According to a further example embodiment of the present disclosure, the working piston is configured to deform, in particular to expand, when the working fluid is introduced into the working fluid compartment, thus increasing the size of the working fluid compartment. Furthermore, the working piston can be configured to deform back, in particular to compress, when the working fluid is pressed out of or discharged from the working fluid compartment, thus reducing the size of the working fluid compartment. For example, the working piston can be arranged movable in the working cylinder in such a manner that an attachment part of the working cylinder, preferably a part of the working piston that faces away from the counter work compartment, is solidly attached to an inner jacket surface of the working cylinder, and a deformation part of the working piston adjacent to the attachment part, preferably located on the side of the counter work compartment, can be displaced relative to the working cylinder in the working direction, in particular can be displaced by way of deformation, preferably can be displaced by expansion and compression.

In an exemplary embodiment of the present disclosure, the working piston comprises at least two working segments, such as the attachment part and the deformation part, which are telescopically moveable relative to each other in the working direction. Thereby, the at least two working segments can move apart when the working fluid is introduced into the working fluid compartment, wherein in particular one of the two working segments, in particular the working segment on the side of the counter work compartment, preferably the deformation part, moves in the direction of the counter work compartment and/or the working segment that faces away from the counter work compartment, in particular the attachment part, remains stationary during the introduction of the working fluid into the working fluid compartment. Furthermore, the at least two working segments can slide into each other when the working fluid is pressed out of the working fluid compartment, wherein in particular one working segment, preferably the one on the side of the counter work compartment, is moved in the working direction in the direction of the working fluid compartment and/or the other working segment, preferably the working segment that faces away from the counter work compartment, preferably the attachment part, remains stationary. According to a further example embodiment, the working fluid compartment is essentially delimited by the at least two working segments. This means that the volume of the working fluid compartment is adjusted or varied when the at least two working segments are expanded or compressed and/or moved apart or slide into each other. The telescopic retraction or extension of the at least two working segments can be facilitated by at least one spring part that connects the at least two working segments to each other and/or preloads the at least two working segments into the retracted position, which defines, for example, the energy delivery mode position.

In another exemplary embodiment of the pumped-storage power plant according to the disclosure, the working piston comprises an elastically deformable working bellows which essentially delimits the working fluid compartment. The working bellows can be designed in such a manner that it expands when the working fluid is introduced into the working fluid compartment and compresses when the working fluid is pressed out of or discharged from the working fluid compartment. For example, it can be provided that the working bellows possesses an undeformed state when the pumped-storage power plant is in the final energy delivery mode position, preferably when the stored working fluid has been essentially entirely pressed out of or discharged from the working fluid compartment. In order to adopt the energy charging mode, it is accordingly necessary to overcome the restoring force that builds up via the elastically deformable working bellows when the working fluid is introduced into the working fluid compartment. Finally, in the energy delivery mode, the build-up deformation restoring force is used to press the working fluid in the working fluid compartment out of the working fluid compartment.

In a further exemplary embodiment of the pumped-storage power plant according to the disclosure, a tension force builds up during the tensioning of the working piston, which is oriented in particular in the working direction, preferably opposite to a direction of displacement of the working piston, in particular opposite to a main direction of deformation of the working piston, wherein in particular the tension force is oriented opposite to the direction of gravity so that the tension force counteracts the weight force of the introduced working fluid. It can further be provided that the tensioning of the working piston occurs by means of a spring. In particular, the tension force acting on the working piston is applied by means of a spring. According to a further example embodiment, the spring is supported on a front surface of the working piston on the side of the counter work compartment and on a bottom surface of the working cylinder preferably delimiting the counter work compartment in the downward direction. It can be provided, for example, that the spring is supported in such a manner that, when the working fluid is introduced into the working fluid compartment, the spring is tensioned, in particular compressed, in the direction of the bottom surface of the working cylinder, and/or, when the working fluid is discharged from, preferably pressed out of, the working fluid compartment, the spring expands in the direction of the front surface of the working piston on the side of the counter work compartment, thus preferably providing a deformation restoring force that acts on the working piston.

According to a further exemplary embodiment of the present disclosure, which can be combined with the preceding aspects and example embodiments, a method for operating a pumped-storage power plant is provided. According to the method, working fluid is filled into an upper fluid compartment of a working cylinder partially submerged in a working fluid reservoir in order to store energy. The working cylinder is arranged in the working fluid reservoir in such a manner that the upper fluid compartment lies above a fluid level of the working fluid reservoir and is fluidly separated by means of a buoyant piston from a lower fluid compartment, which lies essentially below the fluid level of the working fluid reservoir.

Furthermore, for the method according to an exemplary embodiment of the disclosure, in order to deliver the energy of the upper fluid, a buoyant force of the working piston is exploited to push the upper fluid out of the upper fluid compartment and/or a discharge of the upper fluid located in the upper fluid compartment from a constant height is enabled.

According to a further exemplary embodiment of the present disclosure, which can be combined with the preceding aspects and example embodiments, a method for operating a pumped-storage power plant is provided. In the method, a working cylinder is fluidly divided into a working fluid compartment and a counter work compartment by means of a working piston.

Furthermore, working fluid is filled or introduced into the working fluid compartment in order to store energy.

For the method according to an exemplary embodiment the disclosure, in order to deliver energy, the working fluid filled or introduced into the working fluid compartment is pressed out of the working fluid compartment and/or discharged from a constant height while exploiting a buoyant force of the working piston, such as a tension force of an elastic component on the working piston and/or a buoyant force of the working piston submerged in a counter working fluid filled in the counter work compartment.

According to a further exemplary embodiment of the method for operating a pumped-storage power plant according to the disclosure, the method can be configured to realize the pumped-storage power plant according to one of the aspects or example embodiments described above.

According to another exemplary embodiment of the present disclosure, which can be combined with the aspects and example embodiments described above, a pumped-storage system is provided. The pumped-storage system can be realized, for example, as an offshore pumped-storage system or as an onshore pumped-storage system. The pumped-storage system according to the disclosure comprises at least two pumped-storage power plants fluidly coupled to each other, which are designed according to one of the aspects or example embodiments described above. According to a further example embodiment, the pumped-storage system, in particular the pumped-storage power plants, can be configured to process and store energy from renewable resources such as wind power, photovoltaics, hydropower, and deliver the stored energy again for a conversion into electrical energy.

In the following description of example embodiments of a pumped-storage power plant according to the disclosure, a pumped-storage power plant according to the disclosure is generally indicated by the reference sign 1. When referring to the different example embodiments explicated with the help of the accompanying figures, in order to avoid repetition when describing the individual embodiments, substantially the differences between the embodiments will be addressed, wherein identical or similar components are provided with identical or similar reference signs.

In an exemplary embodiment, the pumped-storage power plant 1 comprises a working cylinder 3 partially submerged in a working fluid reservoir 5, for example a water storage or a body of water such as a lake or a sea. The working cylinder 3 comprises an upper fluid compartment 9 arranged essentially above a fluid level 7 of the working fluid reservoir 5 and a lower fluid compartment 11 arranged essentially below the fluid level 7. According to the example embodiment, the working cylinder 3 is realized as an essentially cylindrical component with constant dimensions which defines a cavity in its interior 13. The cavity 13 is closed off in relation to the surrounding area in the area of the upper fluid compartment 9 and open in relation to the working fluid reservoir 5 in the area of the lower fluid compartment 11. For example, the lower fluid compartment 11 has a shape that is open towards the working fluid reservoir 5 on one front side 15, for example in the form of a through-hole 17. Furthermore, the lower fluid compartment 11 has a plurality of preferably evenly distributed through-holes 21 on its jacket surface 19, via which an additional fluid exchange between the working fluid reservoir 5 and the interior of the lower fluid compartment 11 is enabled. According to the example embodiment in FIG. 1, the pumped-storage power plant 1 is oriented essentially in the direction of gravity G, i.e. the working cylinder 3 is oriented essentially in the direction of gravity G, which, according to FIG. 1, points downwards. In other words, the working cylinder 3 extends essentially along a direction of longitudinal extension oriented parallel to the direction of gravity G. A radial direction R oriented essentially perpendicular to the direction of gravity G and thus to the direction of longitudinal extension defines a radial dimension of the working cylinder 3. As illustrated in FIG. 1, the through-holes 21 are distributed essentially evenly on the jacket surface 19 of the lower fluid compartment 11 both in the direction of longitudinal extension and in the radial direction R, although it is clear that an uneven distribution in the direction of longitudinal extension and/or the radial direction R is also conceivable. A buoyant piston 23 is arranged inside the working cylinder 3, which is movably guided relative to the working cylinder in a direction of displacement V oriented parallel to the direction of gravity G. The buoyant piston 23 is arranged in the working cylinder 3 and guided so as to be movable relative to the working cylinder 3 in such a manner that the upper fluid compartment 9 is sealed off from the lower fluid compartment 11 so as to prevent an exchange of fluid, illustrated according to FIG. 1 as a gravitationally induced exchange of fluid, between the upper fluid compartment 9 and the lower fluid compartment 11.

In order to seal the upper fluid compartment 9 vis-à-vis the lower fluid compartment 11, a group of a plurality of seals 25 is arranged between the buoyant piston 23 and the working cylinder 3. Referring to FIGS. 2 and 3, one can see that the seals 25 are accommodated in a groove 29 formed on an inner jacket surface 27 of the working cylinder 3. Returning to FIG. 1, one can see that the group of a plurality of seals 25, seven circumferential seals 25 according to FIG. 1, are distributed along the longitudinal extension of the working cylinder 3, all of which are arranged in the area of the upper fluid compartment 9. At least one of the seals 25, preferably all of the seals 25, can be activated, for example can be activated piezoelectrically or electromagnetically and/or hydraulically and/or pneumatically exposed, in such a manner that the at least one seal 25 expands in the direction of the buoyant piston 23 when activated (FIG. 2) in order to build up, preferably in a continuous manner, a holding force such as a frictional force and/or form-fitting force between the buoyant piston 23 and the working cylinder 3 in order to hold the buoyant piston 23 in place relative to the working cylinder 3. FIG. 1 schematically shows the pumped-storage power plant 1 arranged in an energy delivery mode position, in particular a final energy delivery mode position, in which the buoyant piston 23 is located essentially entirely above the working fluid reservoir 5. This is due to the fact that the buoyant piston 23 is realized in such a manner that its buoyant force relative to the working fluid reservoir 5 is greater than its weight force acting in the direction of gravity G. As shown in FIG. 2, the upper seal 25 is activated, which is depicted as an expansion acting in particular in the radial direction R, said expansion being visible in the convex midsection 31 in FIG. 2 which leads into two straight sections 33, 35 adjacent to the midsection 31. To realize this, the seal 25 is realized, for example, as a hollow seal which defines a cavity 37 in its interior and which can be activated by means of an activation power source 39 shown schematically in FIG. 1. The activation power source 39 can be, for example, a pneumatic and/or hydraulic source and is fluidly connected via a conduit system 41 to at least one seal 25 in order to activate or deactivate, preferably hydraulically and/or pneumatically expose, the at least one seal 25 in order to cause its expansion in the radial direction R (FIG. 2) or compression in the radial direction R (FIG. 3) which leads to a reduction, preferably essentially to an elimination, of the holding force between the buoyant piston 23 and the working cylinder 3.

The manner of operation of the pumped-storage power plant 1 according to exemplary embodiments of the disclosure is illustrated in view of FIGS. 1, 4 and 5 together in the light of three illustrative operating positions of the pumped-storage power plant 1, i.e. of the buoyant piston 23 in the working cylinder 3. When reference is made in the following description to an energy charging mode or an energy charging mode position, this means an operation or a state in which working fluid is introduced, for example from the working fluid reservoir 5, into the upper fluid compartment 9, in particular into the cavity 13, in particular with the aim of submerging the buoyant piston 23 relative to the fluid level 7 in the lower fluid compartment 11 under the influence of the weight force and/or the hydrodynamic pressure of the upper fluid introduced into the upper fluid compartment 9 (sequence of FIGS. 1, 4 and 5). Energy to be stored by means of the pumped-storage power plant 1 is used at least partially for introducing working fluid into the upper fluid compartment 9. For this purpose, for example, a pump-turbine unit 43 arranged essentially above the fluid level 7 and/or outside the fluid reservoir 5 can be coupled to the working cylinder 3, in particular fluidly connected to the upper fluid compartment 9, in order to pump working fluid, for example, from the fluid reservoir 5 into the upper fluid compartment 9. For this purpose, the pump-turbine unit 43 has a conduit system 45 which leads into the working cylinder 3 and has, for example, an inlet opening 47 and an outlet opening 49. As illustrated in FIG. 1, the conduit system 45 splits at a bifurcation 51 into an inlet conduit 53 and an outlet conduit 55, which are respectively fluidly connected to the upper fluid compartment 9. To transition from the operating state illustrated in FIG. 1—which defines, for example, an energy delivery operating state, in particular a final energy delivery mode position of the buoyant piston 23 within the working cylinder 3—to the energy charging mode (FIGS. 4, 5), the pump-turbine unit 43 pumps working fluid into the upper fluid compartment 9 via the conduit system 45, wherein, under the influence of the weight force of the upper fluid in the upper fluid compartment 9, the piston 23 is displaced downward in the direction of gravity G and submerged in a continuous manner into the working fluid reservoir 5. In FIG. 4, the buoyant piston 23 is partially submerged into the lower fluid compartment 11, wherein the operating position of the buoyant piston 23 shown in FIG. 4 can be called the energy charging mode position when the starting point is FIG. 1 and the energy delivery mode position when the starting point is FIG. 5. When reference is made in the following description to the energy delivery mode or energy delivery mode state or energy delivery mode position, this means a state or position in which upper fluid is pressed out of the upper fluid compartment 9 under the influence of the buoyant force of the buoyant piston 23 relative to the working fluid 5 and/or in which a fluid column (not shown) of upper fluid built up during the energy charging mode is discharged from the upper fluid compartment 9, preferably at a constant rate. The activatable at least one seal 25 is used to ensure or prevent a displacement of the buoyant piston 23 in the direction of displacement V, wherein an activation of the at least one seal 25, which state is illustrated in FIG. 2, leads to the holding force resulting from the expansion of the at least one seal 25 in the direction of the buoyant piston 23, thus causing the buoyant piston 23 to be held in place relative to the working cylinder 3, regardless of whether or not working fluid has already been pumped into the upper fluid compartment 9. In order to release, preferably release entirely, the buoyant piston 23 and thus enable a displacement of the buoyant piston 23 in the direction of displacement V, both in the direction of gravity G in order to adopt the energy charging mode and against the direction of gravity G in order to adopt the energy delivery mode, the at least one seal 25 is controlled again, in particular deactivated, which state is illustrated schematically in FIG. 3.

FIG. 5 shows the buoyant piston 23 essentially almost entirely submerged in the working fluid reservoir 5 and/or located essentially entirely inside the lower fluid compartment 11. The final energy charging operating state is adopted when the buoyant piston 23 is essentially entirely submerged in the working fluid reservoir 5, i.e. a front side 57 of the buoyant piston 23 facing the upper fluid compartment lies essentially at the level of the fluid level 7. A maximum storage capacity of the pumped-storage power plant 1 according to the disclosure is then reached. According to the example embodiment illustrated in FIGS. 1 to 5, in order to transition from the state illustrated in FIG. 1, which is, for example, a final energy delivery mode state, to the approximately final energy charging operating state illustrated in FIG. 5, working fluid is pumped into the upper fluid compartment 9 by means of the pump-turbine unit 43 until the latter is essentially entirely filled with working fluid (FIG. 5) and the weight force acting on the buoyant piston 23 from the upper fluid has caused the buoyant piston 23 to move downwards into the lower fluid compartment 11 against the buoyant force of the buoyant piston 23 relative to the working fluid reservoir 5. In this final energy charging operating state, it can be provided, for example, that the buoyant force of the buoyant piston 23 and the weight force of the upper fluid introduced into the upper fluid compartment 9 are essentially balanced, i.e. a state of equilibrium is reached, so that no further displacement of the buoyant piston 23 occurs in the direction of displacement V. Furthermore, it can be provided that the at least one seal 25—according to FIG. 5 the lowest seal 26 arranged close to the lower fluid compartment 11—is activated, in particular hydraulically and/or pneumatically exposed, in order to generate a holding frictional force between the buoyant piston 23 and the working cylinder 3, which is intended to counteract a movement of the buoyant piston 23 in the direction of displacement V. It is thus possible to maintain the energy charging operating state of the pumped-storage power plant 1 and to switch to an energy delivery operating state when there is a demand for energy and the upper fluid is to be pressed out of or discharged from the upper fluid compartment 9 again in order to thereby operate the pump-turbine unit 43 in a generator mode. In the generator mode, the pump-turbine unit 43 is designed to convert the flow energy of the upper fluid pressed out of or discharged from the upper fluid compartment 9 into mechanical energy, for example in order to drive a current generator which can in turn feed an electrical consumer in order to supply it with electricity or energy. The upper fluid is then discharged or pressed out of the upper fluid compartment 9 via an outlet conduit 55. FIGS. 1 to 5 show an embodiment of the pumped-storage power plant 1 in which the working cylinder 3 is arranged so as to be free-floating in the working fluid reservoir 5. Further embodiments are illustrated with reference to the subsequent figures.

FIG. 6 schematically illustrates a further exemplary embodiment of a pumped-storage power plant 1 according to the disclosure, in which an auxiliary body 59 is attached to the working cylinder 3, in particular to the lower fluid compartment 11. The auxiliary body 59 can be, for example, an annular weighted body that runs around the entire circumference of the working cylinder 3. Alternatively, the auxiliary body 59 can only run around a part of the working cylinder 3 and/or consist of a plurality of auxiliary bodies 59 resembling arced segments which respectively surround sections of the working cylinder 3. According to the embodiment shown in FIG. 6, the auxiliary body 59 is essentially entirely submerged in the working fluid reservoir 5 and arranged outside the working cylinder 3. For example, it can be provided that the auxiliary body 59 is coupled to the buoyant piston 23 by means of a cable structure (not shown). In particular, the at least one auxiliary body 59 serves to compensate or absorb forces acting on the pumped-storage power plant 1, especially in the free-floating configuration of the working cylinder 3 in the working fluid reservoir 5. The auxiliary body 59 can also serve, for example, to transmit a force component being directed opposite to the weight force of the upper fluid to the buoyant piston 23 in order to counteract a displacement of the buoyant piston 23 from the final energy delivery mode position illustrated in FIG. 6 to an energy charging mode position. This configuration has proven to be particularly advantageous when the buoyant piston 23 or its material is selected so that a buoyant force of the working piston 23 relative to the working fluid reservoir 5 is greater than the weight force of the upper fluid in the final energy delivery mode position of the buoyant piston 23. This means that, even when the upper fluid compartment 9 is completely full—i.e. when the free upper fluid compartment area 61, which is delimited in FIG. 6 by the front surface 57 of the buoyant piston 23 and the upper fluid compartment 9, is filled entirely—the acting weight force is smaller than the buoyant force of the buoyant piston 23 relative to the fluid reservoir 5. The pump-turbine unit 43, which was explained with reference to FIGS. 1 to 5, can be configured to overcome the excess buoyant force, for example by providing a hydrodynamic pressure by means of a flow of the working fluid which acts on the front surface 57 of the buoyant piston 23 and thereby generates a force component in the direction of gravity G and thus against the direction of the buoyant force.

The embodiment according to FIG. 7 differs from the embodiment according to FIG. 6 essentially in that a mooring 63 is provided in order to moor the working cylinder 3 on a floor 65 of the working fluid reservoir 5. The mooring 63 can, for example, have a structure similar to that of a lattice or cage, for example made of metal, and/or essentially entirely surround the working cylinder 3, in particular the lower fluid compartment 11. For example, the mooring 63 is arranged exclusively below the fluid level 7 in the working fluid reservoir 5. A mooring, like the cage-structured mooring 63 according to FIG. 7, has the advantage that forces acting on the pumped-storage power plant 1 can be absorbed by the mooring 63, which has a positive effect on the stability of the pumped-storage power plant 1.

In contrast to FIG. 7 in which the working cylinder 3 is moored to the floor 65 of the working fluid reservoir 5, the working cylinder 3 in FIG. 8 is arranged so as to be free-floating in the working fluid reservoir 5. In order to be able to absorb or compensate the forces acting on the pumped-storage power plant 1 during the operation of the pumped-storage power plant 1, an arrangement of equalizing bodies 67 and floating/submerged bodies 69 is provided. Both the equalizing bodies 67, which are arranged essentially outside the fluid reservoir, and the floating/submerged bodies 69 being substantially submerged below the fluid level 7 in the working fluid reservoir 5, which are configured as submerged bodies in FIG. 8, are arranged near the fluid level 7 outside the working cylinder 3. The equalizing bodies, which are arranged essentially above the fluid level 7 and which can, for example, be hollow and have a density which is lower than the density of the working fluid located in the working fluid reservoir 5, can be submerged in the working fluid reservoir 5 in the event of forces acting on the pumped-storage power plant 1 and, as a result of their lower density, thus generate a counterforce which causes the equalizing bodies 67 to re-emerge from the working fluid reservoir. For example, it is provided that the equalizing bodies 67 are solidly connected to the working cylinder 3 so that the counterforce that occurs when the equalizing bodies 67 are submerged is transmitted to the working cylinder 3 in order to stabilize the pumped-storage power plant 1 again in its initial non-displaced operating position. Essentially entirely submerged in the working fluid reservoir 5 are submerged bodies 69, the density of which approximately corresponds, for example, to the density of the working fluid in the working fluid reservoir 5 so that the submerged bodies 69 act essentially neutrally, i.e. do not initially transmit any force component to the pumped-storage power plant 1. When the pumped-storage power unit 1 is at least partially raised in comparison with the position shown in FIG. 8 as a result of forces acting on it, i.e. when it rises from the fluid reservoir 5 against the direction of gravity G, the submerged bodies 69 act to increase the weight of the pumped-storage power unit 1. The submerged bodies 69 thus provide an additional weight force opposite to that force causing the weight force, which can be utilized to move the pumped-storage power unit 1 back, in particular in order to stabilize the pumped-storage power unit 1 in its position relative to the fluid level 5, i.e. its position in the direction of gravity G. It can be provided that the equalizing bodies 67 and/or the floating/submerged bodies 69 are attached to the working cylinder 3 by means of a cable structure intimated by the reference sign 71. In particular, the cable structure 71 is supported on an upper end area, preferably the cover area 73 of the upper fluid compartment 9. The shape and/or dimensions of the compensating bodies 67 or floating/submerged bodies 69 are, like those of the auxiliary bodies 59, not limited to a specific shape and/or specific dimensions. These can, for example, be designed to be annular and/or to extend partially or even entirely around the working cylinder 3 and/or consist of partial segments, in particular arced structures surrounding the working cylinder 3 in the manner of arcs forming a ring shape. With reference to FIGS. 7, 8 and 9, it is noted that the conduit system 41 and the activation power source 39 connected to the same are omitted for the sake of clarity, although the provision of an activation power source 39 and a conduit system 41 is also possible according to the embodiment shown in FIGS. 7 and 8.

FIG. 9 illustrates a further exemplary embodiment of a pumped-storage power plant 1 according to the disclosure, which differs from the embodiments described in the foregoing essentially in that the working fluid reservoir 5 is realized as a tank, drum, canister or the like 75. For example, a rainwater tank 75 set up outdoors has proven expedient. The pump-turbine unit 43 can draw the working fluid to be introduced into the upper fluid compartment 9, for example, from the tank 75 or be connected to a separate working fluid reservoir source (not illustrated). Furthermore, alternatively to the embodiment shown in FIG. 9, which is closed vis-à-vis the surrounding area in the upward direction, at least one opening to the surrounding area can be provided in the upward direction in the area of the cover 73, through which, for example, rainwater can flow into the upper fluid compartment 9 which can be used to displace the buoyant piston 23 downwards into the lower fluid compartment 11 arranged in the tank 75 in order to place the pumped-storage power plant 1 in the energy charging mode. The working fluid reservoir 5 delimited by means of the tank 75 according to FIG. 9 can be called a closed working fluid reservoir, while the working fluid reservoirs 5 illustrated according to FIGS. 1 to 8 can be realized as open working fluid reservoirs, e.g., open bodies of water.

With reference to FIGS. 10 and 11, two further pumped-storage power plants 1 according to exemplary embodiments of the present disclosure are described. The pumped-storage power plant 1 comprises an essentially circular cylindrical working cylinder 3 with a working fluid compartment 109 and a counter work compartment 111 fluidly separated from the working fluid compartment 109. According to FIGS. 10 and 11, the pumped-storage power plant 1 is oriented essentially in the direction of gravity G so that the working fluid compartment 109 is arranged above the counter work compartment 111 in the schematic illustrations. The working fluid compartment 109 is separated and fluidly sealed vis-à-vis the counter work compartment 111 by a working piston 123 in such a manner that an exchange of fluid between the working fluid compartment 109 and the counter work compartment 111 is prevented. The working piston 123 is movable relative to the working cylinder 3 in a working direction A, which is oriented along the direction of gravity G according to FIGS. 10 and 11, but generally lies essentially in the direction of longitudinal extension of the working cylinder 3. In simple terms, when the working piston 123 moves relative to the working cylinder 3, the working piston 123 performs a movement between or in the direction of the working fluid compartment 109 and the counter work compartment 111. In an energy charging mode of the pumped-storage power plant 1, fluid is introduced into the working fluid compartment 109. This can occur, for example, via a pump-turbine unit 43 discussed in relation to FIG. 1 to 9 or, as illustrated schematically in FIG. 10, simply via a pump (not shown) connected to a conduit system 45 which leads into the upper fluid compartment 109 via a conduit inlet 47. Like the embodiments described in the foregoing, the working fluid introduced into the working fluid compartment 109 produces a force on the working piston 123. The force can be, for example, essentially the weight force of the working fluid located in the working fluid compartment 109. Furthermore, the force can at least partially consist in a hydrodynamic pressure force which is generated as a result of the introduction of the flow of working fluid into the working fluid compartment 109 and presses against a front surface 113 on the side of the working fluid compartment in order to move the working piston 123 in the direction of the counter work compartment 111, i.e. essentially into the counter work compartment 111 while tensioning the working piston 123. The tensioning of the working piston 123 can occur, for example, by tensioning an elastic component 115 or, alternatively, by submerging the working piston 123 in a counter working fluid filled into the counter work compartment 111, wherein the working piston 123 or its material in the latter variant should be selected so that a buoyant force of the working piston 123 is created relative to the counter working fluid introduced into the counter work compartment 111. By tensioning the elastic component 115, the latter builds up a deformation restoring force against the movement of the working piston 123, which essentially constitutes the potential energy which is stored by the pumped-storage power plant 1 and which can be made available again in an energy delivery mode described in the following. In the energy delivery mode, under the influence of the tension force of the tensioned working piston 123, working fluid is pressed out of the working fluid compartment. Thereby, as described with reference to FIGS. 1 to 9, the working cylinder 3 can be coupled by means of the conduit system 45 to the pump-turbine unit 43, which can be operated in a generator mode in order to operate a current generator which converts mechanical energy into electrical energy. According to FIGS. 10 and 11 in which, instead of the pump-turbine unit 43, a pump (not illustrated) is provided for pumping working fluid into the working fluid compartment 109, the working fluid is pumped in the energy delivery mode via a conduit 117 to a power converter that can generate electrical energy from the flow energy of the outflowing working fluid. For example, the conduit has a connecting socket or nozzle 119 at one end for connecting to the power converter. The latter can be realized, for example, by filling at least one container which, by means of a chain/belt assembly (not shown), converts the weight force of the outflowing working fluid into torque that can be converted into electrical energy by a current generator.

In FIG. 11 and in FIG. 10, the tensioning of the working piston 123 occurs by means of an elastic component 115 configured as a spring. The spring 115 is supported on a front surface 121 on the side of the counter work compartment and on a bottom surface 122 of the working cylinder 3 which delimits the counter work compartment 111 in the downward direction. This is realized in that, when the working fluid is introduced into the working fluid compartment 109, the spring 115 is tensioned in the direction of the bottom surface 122 of the working cylinder 3 so that a deformation restoring force builds up against the displacement of the working piston 123 in the working direction A. The introduction of the working fluid into the working fluid compartment 109 and the resulting tensioning of the spring or elastic component 115 occur together with a simultaneous increase in size of the working fluid compartment 109, i.e. an expansion or extension of the working fluid compartment 109 in the direction of the counter work compartment 111. When the working fluid is pressed out of the working fluid compartment 109, i.e. during the energy delivery mode, this process is reversed.

According to FIG. 10, the working piston 123 has at least two—or as illustrated in FIG. 10, four—working segments 125 that are movable in relation to one another in the manner of a telescope in the working direction A. The working segments 125 are arranged and coordinated relative to one another in such a manner that, when the working fluid is introduced into the working fluid compartment 109, the working segments 125 are driven apart, which state is partially illustrated in FIG. 10. When the working fluid is pressed out of the working fluid compartment 109, the at least two, preferably four, working segments 125 retract, thus reducing the size of the working fluid compartment 109 and increasing the size of the counter work compartment 111. Thereby, the spring 115 presses against the working segment 125 on the side of the counter work compartment and pushes it in the working direction A into the further working segments 125. According to the illustration shown in FIG. 10, the working piston 123 is attached to an inner side of the working cylinder 127 by means of an attachment section 129 of the working piston 123. The attachment section 129 is attached to the working cylinder 3 so as to remain essentially stationary when the working piston 123 moves in the working cylinder 3. Next to the attachment section 129 is a deformation section 131, which is characterized in that it expands, i.e. its working segments 125 are driven apart, during operation and compresses, i.e. its working segments 125 retract into one another, during the energy delivery mode.

The embodiment according to FIG. 11 differs from the embodiment according to FIG. 10 essentially only in that the working piston 223 (FIG. 11) does not consist of working segments 125 that can be slid into one another or moved apart in the manner of a telescope (FIG. 10), but is configured as an elastically deformable working bellows 223 which essentially delimits the working fluid compartment 109. The working bellows 223 is realized in such a manner that it expands, namely in the direction of the counter work compartment 111, when the working fluid is introduced into the working fluid compartment 109. When the working fluid is pressed out of the working fluid compartment 109 as a result of the tension force, in particular the deformation restoring force, provided by the spring 115, the elastic working bellows 223 compresses again, thus reducing the size of the working fluid compartment 109. Thereby, it can be provided that the working bellows 223 inflates like a balloon and thereby presses or tensions the spring 115 in the direction of the bottom surface 122 of the counter work compartment 111 when the working fluid is introduced into the working fluid compartment 109. Furthermore, a ventilation device 133 can be integrated into the working fluid compartment 109, for example in order to enable a pressure equalization vis-à-vis the atmosphere.

FIGS. 12 to 13 show a further exemplary embodiment of a pumped-storage power plant 1 according to the disclosure, a first embodiment of a surge tank 77 being illustrated in FIG. 12 and a second embodiment of a surge tank 77 being illustrated in FIG. 13. The surge tank 77 generally serves to absorb or compensate pressure surges acting on the pumped-storage power plant 1. This can be necessary, for example, if the energy delivery mode is interrupted, which results in a free-falling upper fluid or working fluid water column having to be intercepted in order to prevent it from striking a stationary component, for example a component of the pump-turbine unit 43, under the influence of its weight force. The surge tank 77 essentially comprises a fluid/equalization line 79 that is provided in addition to the conduit system 45 of the pump-turbine unit 43, into which the working fluid or upper fluid already pressed out of or discharged from the upper fluid compartment 9 or working fluid compartment 109 is intended to flow in order to prevent damage to the pump-turbine unit 43. The fluid line 79, which is configured as a hollow line, is flooded by the discharged upper fluid or working fluid in such a manner that the latter is transported to a vertical height against the direction of gravity G in order to convert or absorb the flow energy into height energy. FIG. 12 shows an embodiment of the surge tank 77 with an essentially U-shaped fluid line section 81 that connects the fluid line 79 to the fluid conduit system 45 of the pump-turbine unit 43 in order to convey fluid into the fluid line 79 in a vertical direction opposite to the direction of gravity so as to convert the flow energy into height energy.

In the embodiment according to FIG. 13, instead of the U-shaped arrangement 81 of the surge tank 77, a pipe-in-pipe design of the surge tank 77 is realized, in which the additional fluid line 79 is realized as a hollow line 83 which surrounds the circumference of the fluid conduit system 45 essentially along the entire longitudinal extension of the latter, thus yielding a closed system, i.e. a system sealed off vis-à-vis the surrounding area. Also in this design of the surge tank 77, it is provided that the working fluid or upper fluid discharged from the upper fluid compartment 9 or working fluid compartment 109 flows into the resulting annular pipe section 85 between the hollow line 83 and the fluid conduit system 45, where it flows in a vertical direction against the direction of gravity G in order to convert or absorb flow energy into potential energy.

One advantage of the pumped-storage power plant 1 according to the disclosure lies, for example, in the simple scalability with respect to its size and/or storage capacity. For example, the working cylinder 3 can have a diameter of up to 10 m, preferably in the range of 1 m to 5 m. An overall longitudinal extension of the working cylinder 3 can be up to 100 m, preferably in the range of 20 m to 80 m.

The features disclosed in the foregoing description, in the figures and in the claims can be of significance both individually as well as in any combination for the realization of the disclosure in its different forms.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 Pumped-storage power plant
3 Working cylinder
5 Fluid reservoir
7 Fluid level
9 Upper fluid compartment
11 Lower fluid compartment
13 Interior
15 front side
17 Opening
19 Jacket
21 Through-hole
23 Buoyant piston
25, 26 Seal
27 Inner jacket surface
29 Groove
31 Midsection
33, 35 Section
37 Cavity
39 Activation power source
40 controller
41 Conduit
43 Pump-turbine unit
45 Conduit system
47, 49 Inlet/outlet
53, 55 Inlet/outlet conduit
57 Front surface
59 Floating/submersion body
61 Upper fluid compartment area
63 Mooring

65 Floor
67 Equalizing body
69 Auxiliary body
71 Cable structure
73 Cover
75 Tank
77 Surge tank
79 Fluid line
81 U-shaped fluid line
83 Hollow line
75 Annular pipe section
109 Working compartment
111 Counter work compartment
113 Front surface
115 Elastic component
117 Conduit
119 Connecting element
121 Front surface
122 Bottom surface
123 Working piston
125 Working segment
127 Inner jacket surface
129 Attachment section
131 Deformation section
133 Ventilation device
223 Working bellows
G Direction of gravity
V Direction of displacement
R Radial direction
A Working direction

The invention claimed is:

1. A pumped-storage power plant comprising:

a buoyant piston;

a working cylinder partially submerged in a working fluid reservoir and having an upper fluid compartment disposed above the buoyant piston and a lower fluid compartment disposed below the buoyant piston; and at least one seal being arranged between the buoyant piston and the working cylinder, wherein the buoyant piston is configured to: be movably guided in a direction of gravity relative to the working cylinder, the buoyant piston, the at least one seal, and the working cylinder cooperating to seal off the upper fluid compartment from the lower fluid compartment to limit a gravitationally induced exchange of fluid between the upper fluid compartment and the lower fluid compartment, and wherein the pumped-storage power plant is configured to operate in:

an energy charging mode in which working fluid is introduced into the upper fluid compartment to increase a partial submergence of the buoyant piston in the working fluid reservoir, under an influence of a weight force and a hydrodynamic pressure of the working fluid introduced into the upper fluid compartment; and an energy delivery mode in which: the working fluid is pressed out of the upper fluid compartment, under an influence of a buoyant force of the buoyant piston.

2. The pumped-storage power plant according to claim 1, wherein the at least one seal is configured to be: activated to hold the buoyant piston in place relative to the working cylinder following the energy charging mode, and deactivated to release the buoyant piston to allow the buoyant piston to move relative to the working cylinder to operate in the energy delivery mode.

3. The pumped-storage power plant according to claim 2, wherein the at least one seal is accommodated in a groove formed on an inner jacket surface of the working cylinder, wherein the at least one seal is configured to expand in a direction of the buoyant piston in response to being activated to increase a holding force between the buoyant piston and the working cylinder.

4. The pumped-storage power plant according to claim 2, wherein an activation of the at least one seal and a displacement of the buoyant piston between an energy charging mode position and an energy delivery mode position are coordinated with each other.

5. The pumped-storage power plant according to claim 2, further comprising:

an activation power source fluidly and/or electrically connected to the at least one seal and configured to activate or deactivate the at least one seal, and a controller configured to control and/or regulate the activation power source to control the activating or deactivating of the at least one seal, the activation power source being coupled to the controller.

6. The pumped-storage power plant according to claim 1, further comprising at least one seal configured:

to seal the buoyant piston and the working cylinder with respect to one another at an end of the buoyant piston that faces away from the lower fluid compartment; and such that, in an energy delivery mode position of the buoyant piston, the at least one seal is activated to increase a predetermined upper fluid column such that the weight force of the upper fluid continuously exceeds the buoyant force of the buoyant piston relative to the working fluid during displacement of the buoyant piston to a final energy charging mode position.

7. The pumped-storage power plant according to claim 1, wherein the buoyant piston and/or the working cylinder is coupled to at least one auxiliary body arranged outside the working cylinder and at least partially submerged in the working fluid reservoir, wherein the auxiliary body is configured to transmit a force component to the buoyant piston that is directed opposite to the weight force of the upper fluid, the force component counteracting a displacement of the buoyant piston from an energy delivery mode position into an energy charging mode position.

8. The pumped-storage power plant according to claim 1, further comprising a pump-turbine arranged outside the working fluid reservoir that is configured to pump working fluid into the upper fluid compartment in the energy charging mode.

9. The pumped-storage power plant according to claim 8, wherein the pump-turbine is configured to operate in a generator mode when the energy delivery mode is adopted to convert flow energy of the upper fluid pressed out of the upper fluid compartment into mechanical energy to drive a current generator.

10. The pumped-storage power plant according to claim 1, further comprising one or more conduits configured to facilitate selective introduction and discharge of the working fluid to/from the upper fluid compartment of the working cylinder, the one or more conduits being located on a side that faces away from the lower fluid compartment.

11. The pumped-storage power plant according to claim 1, wherein the working cylinder is arranged so as to be free-floating in the working fluid reservoir or is solidly moored in a floor of the working fluid reservoir.

12. The pumped-storage power plant according to claim 1, wherein a buoyant force of the buoyant piston relative to the working fluid arranged in the working fluid reservoir is greater than the weight force of the upper fluid in a final energy delivery mode position of the buoyant piston in order to convey the buoyant piston into the energy charging mode position.

13. The pumped-storage power plant according to claim 1, further comprising a controller that is configured to control the pumped-storage power plant to selectively operate in the energy charging mode and the energy delivery mode.

14. A method for operating a pumped-storage power plant including a buoyant piston, a working cylinder partially submerged in a working-fluid reservoir, and at least one seal arranged between the buoyant piston and the working cylinder, the method comprising:

filling working fluid into an upper fluid compartment of the working cylinder to store energy, the upper fluid compartment lying above the buoyant piston and being fluidly separated from a lower fluid compartment of the working cylinder lying below the buoyant piston, the at least one seal, the buoyant piston, and the working cylinder cooperating to seal off the upper fluid compartment from the lower fluid compartment so as to limit a gravitationally induced exchange of fluid between the compartments; and to deliver the energy, pressing out the working fluid of the upper fluid compartment by the buoyant piston, based on a buoyant force of the buoyant piston.

* * * * *